United States Patent
Shinzato

(10) Patent No.: US 9,311,607 B2
(45) Date of Patent: Apr. 12, 2016

(54) INFORMATION PROCESSING DEVICE, INFORMATION PROCESSING METHOD, PROGRAM FOR INFORMATION PROCESSING DEVICE, AND RECORDING MEDIUM

(71) Applicant: Rakuten, Inc., Shinagawa-ku, Tokyo (JP)

(72) Inventor: Keiji Shinzato, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 246 days.

(21) Appl. No.: 13/984,382

(22) PCT Filed: Jan. 30, 2013

(86) PCT No.: PCT/JP2013/052037
§ 371 (c)(1),
(2) Date: Aug. 8, 2013

(87) PCT Pub. No.: WO2013/136865
PCT Pub. Date: Sep. 19, 2013

(65) Prior Publication Data
US 2014/0058984 A1    Feb. 27, 2014

(30) Foreign Application Priority Data

Mar. 12, 2012  (JP) ................. 2012-054759

(51) Int. Cl.
*G06F 15/00* (2006.01)
*G06F 15/18* (2006.01)
(Continued)

(52) U.S. Cl.
CPC ........ *G06N 99/005* (2013.01); *G06F 17/30268* (2013.01)

(58) Field of Classification Search
CPC .............. G06F 17/2795; G06F 17/03–17/268; G06F 15/00; G06F 15/18
See application file for complete search history.

(56) References Cited

U.S. PATENT DOCUMENTS

2007/0250493 A1* 10/2007 Peoples et al. ............... 707/4
2011/0099003 A1*  4/2011 Isozu et al. .................. 704/9

FOREIGN PATENT DOCUMENTS

JP    11-120193 A    4/1999
JP    2002-318814 A    10/2002
(Continued)

OTHER PUBLICATIONS

'Development of a Large-scale Web Crawler and Search Engine Infrastructure': Akamine, 2009, $3^{rd}$ international universal communication symposium, pp. 126-131.*
(Continued)

*Primary Examiner* — Kakali Chaki
*Assistant Examiner* — Peter Coughlan
(74) *Attorney, Agent, or Firm* — Sughrue Mion, PLLC

(57) ABSTRACT

A base word to be a base, a compound word in which the base word becomes a modifiee, classification items to classify the compound word, and feature information about a feature that provides a clue to classify the compound word are acquired (S10, S11, S12, S13), the compound word containing the base word is distributed into the acquired classification item using a classification model generated in advance and the acquired feature information (S14, S15), base word related information containing a plurality of elements related to the base word is acquired based on the base word (S16), each of at least a portion of the elements contained in the acquired base word related information is classified into one of the classification items in accordance with a result of the classification (S17), and the classified base word related information (Web pages 40, 50, 51) is output (S18).

16 Claims, 21 Drawing Sheets

(51) Int. Cl.
*G06N 99/00* (2010.01)
*G06F 17/30* (2006.01)

(56) References Cited

FOREIGN PATENT DOCUMENTS

| | | |
|---|---|---|
| JP | 2004-164079 A | 6/2004 |
| JP | 2005-190284 A | 7/2005 |

OTHER PUBLICATIONS

'Constructing Dictionaries for Named Entity Recognition on Specific Domains from the Web': Shinzato, 2006, citeseer.*

'Concept-instance relation extraction from simple noun sequences using a full-text search engine': Sumida, 2006, proceedings of the ISWC.*

Kiyoko Uchiyama et al., "A Study for Connections Among Constituent Elements of Nominal Compounds: An Evaluation of Grammatical Categories Based on Grammatical Characteristics", The Institute of Electronics Information and Communication Engineers, Technical Report of IEICE, 1999, pp. 7-12, vol. 99, No. 237.

Gamper, Johann, et al.,"A Data Model and its Implementation for a Web-Based Language Learning System", Proceeding of the 12th International World Wide Web Conference (WWW'03), pp. 217-225, 20-24, 2003.

Delahunty and Garvey, "Morphology and Word Formation" the English Language From Sound to Sense, pp. 121-146, 2010.

Morita, Kazuhiro, et al., "Word classification and hierarchy using co-occurrence word information", Information Processing and Management 40 (2003), pp. 957-972.

* cited by examiner

| CLASSIFICATION ITEM | LEXICO-SYNTACTIC PATTERN | COMPOUND WORD FOR LEARNING |
|---|---|---|
| MATERIAL | M NO H, M SEI H, ... (H OF M, H MADE OF M, ...) | FA BESUTO, NAIRON BESUTO, NAIRON JAKETTO ... (FUR VEST, NYLON VEST, NYLON JACKET) |
| PURPOSE | M NO H, M YOU H, ... (H OF M, H FOR THE PURPOSE OF M, ...) | GAKUSHU DESUKU, SUIEI KYAPPU, WOKINGU YOU SOKKUSU ... (LEARNING DESK, SWIMMING CAP, SOCKS FOR WALKING, ...) |
| SIZE | M NA H, M NO H, ... (M-LIKE H, H OF M, ...) | RONGU TEBUKURO, MINI DORESU, OOGATA BAGGU, ... (LONG GLOVES, MINI DRESS, LARGE BAG, ...) |
| OBJECT | M YOU H, M YOUNO H, ... (H FOR M, H USED FOR M, ...) | FIRUTA KEISU, MEGANE KEISU, ... (FILTER CASE, GLASSES CASE, ...) |
| ... | ... | ... |

FIG.3

| BASE WORD | OTHER WORDS | NUMBER | CATEGORY ID |
|---|---|---|---|
| HERUMETTO (HELMET) | | ... | ... |
| HERUMETTO (HELMET) | KODOMO (CHILD) | ... | ... |
| HERUMETTO (HELMET) | JITENSHA (BICYCLE) | ... | ... |
| HERUMETTO (HELMET) | BOUSAI (DISASTER PREVENTION) | ... | ... |
| ⋮ | ⋮ | ⋮ | ⋮ |
| BOUSAI (DISASTER PREVENTION) | HERUMETTO (HELMET) | ... | ... |
| KODOMO (CHILD) | HERUMETTO (HELMET) | ... | ... |
| ⋮ | ⋮ | ⋮ | ⋮ |
| JITENSHA YOU HERUMETTO (HELMET FOR BICYCLE) | | ... | ... |
| ⋮ | ⋮ | ⋮ | ⋮ |
| KODOMO YOU JITENSHA (BICYCLE FOR CHILDREN) | | ... | ... |
| ⋮ | ⋮ | ⋮ | ⋮ |

FIG.4

INFORMATION PROCESSING DEVICE, INFORMATION PROCESSING METHOD, PROGRAM FOR INFORMATION PROCESSING DEVICE, AND RECORDING MEDIUM

CROSS REFERENCE TO RELATED APPLICATIONS

This application is a National Stage of International Application No. PCT/JP2013/052037 filed Jan. 30, 2013, claiming priority based on Japanese Patent Application No. 2012-054759 filed Mar. 12, 2012, the contents of all of which are incorporated herein by reference in their entirety.

TECHNICAL FIELD

The present invention relates to technical fields of an information processing device that generates a Web page, an information processing method, a program for an information processing device, and a recording medium.

BACKGROUND ART

Search systems that list and display a search result based on a search keyword in a Web page or the like have been known. For example, Patent Document 1 discloses a product search method that lists product images searched for based on a keyword to make the comparison of product easier.

CITATION LIST

Patent Document

Patent Document 1: Japanese Patent Application Laid-Open (JP-A) No. 2002-318814

SUMMARY OF THE INVENTION

Problem to be Solved by the Invention

However, according to conventional technology like Patent Document 1, when a search for product or the like is conducted based on some search keyword (for example, "JITENSHA" (bicycle)), a search result that is hard to view for the user may be obtained because not only product as a main body, but also accessories (for example, "JITENSHA YOU HERUMETTO, JITENSHA YOU RAITO" (helmet for bicycle, light for bicycle") thereof are mixed. Further, when an attempt is made to automatically generate a Web page featuring a predetermined topic, the Web page may be hard to view for the user because product as a main body and accessories thereof are mixed.

The present invention is made in view of such problems and a subject thereof is to provide an information processing device and the like capable of providing a display that is easy for the user to view.

Means for Solving the Problem

To achieve the above subject, an aspect of an exemplary embodiment provides a base word acquisition means that acquires abase word to be a base, a compound word acquisition means that acquires a compound word in which the base word acquired by the base word acquisition means becomes a modifiee from a compound word storage means, a classification item acquisition means that acquires classification items to classify the compound word acquired by the compound word acquisition means by referring to a classification item storage means, a feature information acquisition means that acquires feature information about a feature that provides a clue to classify the compound word acquired by the compound word acquisition means by referring to a feature information storage means, a compound word classification means that distributes the compound word containing the base word into the classification item acquired by the classification item acquisition means using a classification model generated in advance and the feature information acquired by the feature information acquisition means for the compound word acquired by the compound word acquisition means, a base word related information acquisition means that acquires base word related information containing a plurality of elements related to the base word based on the base word, a base word related information classification means that classifies each of a portion of the elements contained in the base word related information acquired by the base word related information acquisition means into one of the classification items in accordance with a classification result by the compound word classification means, and an output means that outputs the base word related information classified by the base word related information classification means.

Thus, the base word related information is classified by classification item and therefore, mixing of the base word related information is distributed out based on the classification item and a display that is easy for the user to view can be provided.

Another aspect of an exemplary embodiment provides the information processing device further including a feature vector generation means that generates a feature vector of the compound word using the feature information for the compound word, a training compound word acquisition means that acquires a compound word for training, a training classification item acquisition means that acquires classification items for training corresponding to the compound word for training acquired by the training compound word acquisition means, and a classification model construction means that constructs the classification model by doing machine training using the feature vector of the compound word for training generated by the feature vector generation means from the compound word for training acquired by the training compound word acquisition means and the classification items for training acquired by the training classification item acquisition means, wherein the feature vector generation means generates the feature vector of the compound word by using the feature information for the compound word acquired by the compound word acquisition means and the compound word classification means distributes the compound word containing the base word into the classification item using the classification model constructed by the classification model construction means and the feature vector of the compound word acquired by the compound word acquisition means.

In this case, a classification model to provide a display that is easy for the user to view can be realized with high precision by machine training. More specifically, when compared with a case of heuristic training, various features can be considered by using machine training so that high precision can be realized and various kinds of information can be effectively used for classification.

Another aspect of an exemplary embodiment provides the information processing device further including a modifier portion acquisition means that acquires a modifier portion with respect to the base word of the compound word, wherein the feature information storage unit stores a classification dictionary associating each of the classification items and a predetermined word, the feature information acquisition means acquires the classification dictionary associating each of the classification items and the predetermined word by referring to the feature information storage means, and the compound word classification means distributes the compound word containing the base word into the classification item using the classification model generated in advance using the classification dictionary stored in the feature information storage means and the feature information for the modifier portion acquired by the modifier portion acquisition means.

In this case, the base word related information is classified in accordance with classification item and therefore, mixing of the base word related information is distributed out based on the classification item and a display that is easy for the user to view can be provided. Further, the compound word can efficiently be distributed into each classification item according to the classification dictionary.

Another aspect of an exemplary embodiment provides the information processing device further including a suffix acquisition means that acquires a suffix from the modifier portion acquired by the modifier portion acquisition means, wherein the compound word classification means distributes the compound word containing the base word into the classification item, using the classification model generated in advance using the classification dictionary stored in the feature information storage means, and using the feature information for the modifier portion excluding the suffix acquired by the suffix acquisition means.

In this case, the compound word can efficiently be distributed into each classification item according to predetermined rules.

Another aspect of an exemplary embodiment provides the information processing device further including a classification dictionary generation means that generates the classification dictionary by deciding association of each of the classification items and the predetermined word in accordance with an appearance number of the predetermined word appearing in a predetermined storage means, or by deciding association of each of the classification items and the predetermined word by extracting the predetermined word suited to an extraction pattern corresponding to each of the classification items from the predetermined storage means.

In this case, a classification dictionary suited to the predetermined storage means such as a predetermined database can be constructed.

Another aspect of an exemplary embodiment provides the information processing device further including a classification item output means that outputs the classification items into which the compound words are distributed to a user terminal device to allow a user to select the specific classification item from the classification items into which the compound words are distributed by the compound word classification means and a user selection result acquisition means that acquires a selection result of the classification items from the user terminal device, wherein the base word related information classification means classifies each of at least a portion of the elements contained in the base word related information acquired based on the base word and the selection result of the classification items acquired by the user selection result acquisition means, into one of the classification items in accordance with the classification result by the compound word classification means.

In this case, a display that is easy for the user to view information desired by the user in accordance with the user's selection can be provided.

Another aspect of an exemplary embodiment provides the information processing device, wherein the base word acquisition means acquires a search keyword from the user terminal device as the base word, the base word related information acquisition means acquires a search result of conducting a search based on the search keyword, and the base word related information classification means classifies each of at least a portion of the elements contained in the search result of conducting the search by the base word related information acquisition means, into one of the classification items in accordance with the classification result by the compound word classification means.

In this case, a display that is easy for the user to view information searched for by the user in accordance with the search keyword input by the user can be provided.

Another aspect of an exemplary embodiment provides the information processing device further including a compound word candidate generation means that generates candidates of the compound word from the base word and a compound word decision means that decides the compound word from the candidates, wherein the compound word acquisition means acquires the compound word decided by the compound word decision means.

In this case, a more appropriate compound word can be generated from generated candidates.

Another aspect of an exemplary embodiment provides the information processing device, wherein the compound word decision means decides the compound word in accordance with the number of shops after the number of shops dealing in product by including candidates of the compound word generated by the compound word candidate generation means in a description of the product being obtained.

In this case, a more appropriate compound word generally used on a shopping site or in a network can be generated.

Another aspect of an exemplary embodiment provides the information processing device, wherein the compound word decision means decides the compound word in accordance with the appearance number of the base word appearing in the predetermined storage means.

In this case, a more appropriate compound word can be generated from a base word generally used on a shopping site or in a network.

Another aspect of an exemplary embodiment provides the information processing device, wherein the compound word decision means decides the compound word in accordance with the number of hits of a search using the candidate of the compound word generated by the compound word candidate generation means as a search keyword.

In this case, a compound word generally used on a shopping site or in a network can be decided so that a more appropriate compound word can be generated.

Another aspect of an exemplary embodiment provides the information processing device, wherein the compound word candidate generation means generates the candidate by combining the base word and a word different from the base word.

In this case, a more appropriate compound word can be generated. In addition, many candidates of the compound word can be generated by combining the base word and other words and such candidates can then be narrowed down to a more appropriate compound word.

Another aspect of an exemplary embodiment provides the information processing device further including a search result acquisition means that acquires a first search result using the base word as the search keyword and a second search result using the compound word as the search keyword and a search result information generation means that generates search result information so that at least a portion of the first search result and the second search result acquired by the search result acquisition means are made to be distinguished and displayed on a screen of a display means.

In this case, mixing of search targets searched for based on search keywords are reduced for display.

Another aspect of an exemplary embodiment provides the information processing device, wherein the search result information generation means generates the search result information so that the search result obtained by removing a portion of the second search result from the first search result is made to be displayed as at least the portion of the first search result.

In this case, mixing of the first search result and the second search result is eliminated, which makes product related to the second search result more noticeable. In addition, the user is more likely to notice a search result based on a compound word.

Another aspect of an exemplary embodiment provides an information processing method of an information processing device that performs information processing, including a base word acquisition step of acquiring a base word to be a base, a compound word acquisition step of acquiring a compound word in which the base word acquired in the base word acquisition step becomes a modifiee from a compound word storage means, a classification item acquisition step of acquiring classification items to classify the compound word acquired in the compound word acquisition step by referring to a classification item storage means, a feature information acquisition step of acquiring feature information about a feature that provides a clue to classify the compound word acquired in the compound word acquisition step by referring to a feature information storage means, a compound word classification step of distributing the compound word containing the base word into the classification item acquired in the classification item acquisition step using a classification model generated in advance and the feature information acquired in the feature information acquisition step for the compound word acquired in the compound word acquisition step, a base word related information acquisition step of acquiring base word related information containing a plurality of elements related to the base word based on the base word, a base word related information classification step of classifying each of a portion of the elements contained in the base word related information acquired in the base word related information acquisition step into one of the classification items in accordance with a classification result in the compound word classification step, and an output step of outputting the base word related information classified in the base word related information classification step.

Another aspect of an exemplary embodiment provides a computer to function as a base word acquisition means that acquires a base word to be a base, a compound word acquisition means that acquires a compound word in which the base word acquired by the base word acquisition means becomes a modifiee from a compound word storage means, a classification item acquisition means that acquires classification items to classify the compound word acquired by the compound word acquisition means by referring to a classification item storage means, a feature information acquisition means that acquires feature information about a feature that provides a clue to classify the compound word acquired by the compound word acquisition means by referring to a feature information storage means, a compound word classification means that distributes the compound word containing the base word into the classification item acquired by the classification item acquisition means using a classification model generated in advance and the feature information acquired by the feature information acquisition means for the compound word acquired by the compound word acquisition means, a base word related information acquisition means that acquires base word related information containing a plurality of elements related to the base word based on the base word, a base word related information classification means that classifies each of a portion of the elements contained in the base word related information acquired by the base word related information acquisition means into one of the classification items in accordance with a classification result by the compound word classification means, and an output means that outputs the base word related information classified by the base word related information classification means.

Another aspect of an exemplary embodiment provides computer-readably recording of a program for an information processing device causing a computer to function as a base word acquisition means that acquires a base word to be a base, a compound word acquisition means that acquires a compound word in which the base word acquired by the base word acquisition means becomes a modifiee from a compound word storage means, a classification item acquisition means that acquires classification items to classify the compound word acquired by the compound word acquisition means by referring to a classification item storage means, a feature information acquisition means that acquires feature information about a feature that provides a clue to classify the compound word acquired by the compound word acquisition means by referring to a feature information storage means, a compound word classification means that distributes the compound word containing the base word into the classification item acquired by the classification item acquisition means using a classification model generated in advance and the feature information acquired by the feature information acquisition means for the compound word acquired by the compound word acquisition means, a base word related information acquisition means that acquires base word related information containing a plurality of elements related to the base word based on the base word, a base word related information classification means that classifies each of a portion of the elements contained in the base word related information acquired by the base word related information acquisition means into one of the classification items in accordance with a classification result by the compound word classification means, and an output means that outputs the base word related information classified by the base word related information classification means.

Effect of the Invention

According to the present invention, base word related information is classified according to classification item and therefore, mixing of the base word related information is distributed out based on the classification item so that a display that is easy for the user to view can be provided.

BRIEF DESCRIPTION OF THE DRAWINGS

FIG. 3 is a schematic diagram showing an example of data stored in a training database in FIG. 2.

FIG. 4 is a schematic diagram showing an example of a query log stored in a query log database in FIG. 2.

MODES FOR CARRYING OUT THE INVENTION

Hereinafter, embodiments of the present invention will be described with reference to the drawings. Incidentally, the embodiments described below are those when the present invention is applied to an information processing system.

[1. Configuration and Function Overview of Information Processing System]

First, a configuration and a general function of an information processing system according to an embodiment of the present invention will be described using FIG. 1.

Figure 1:
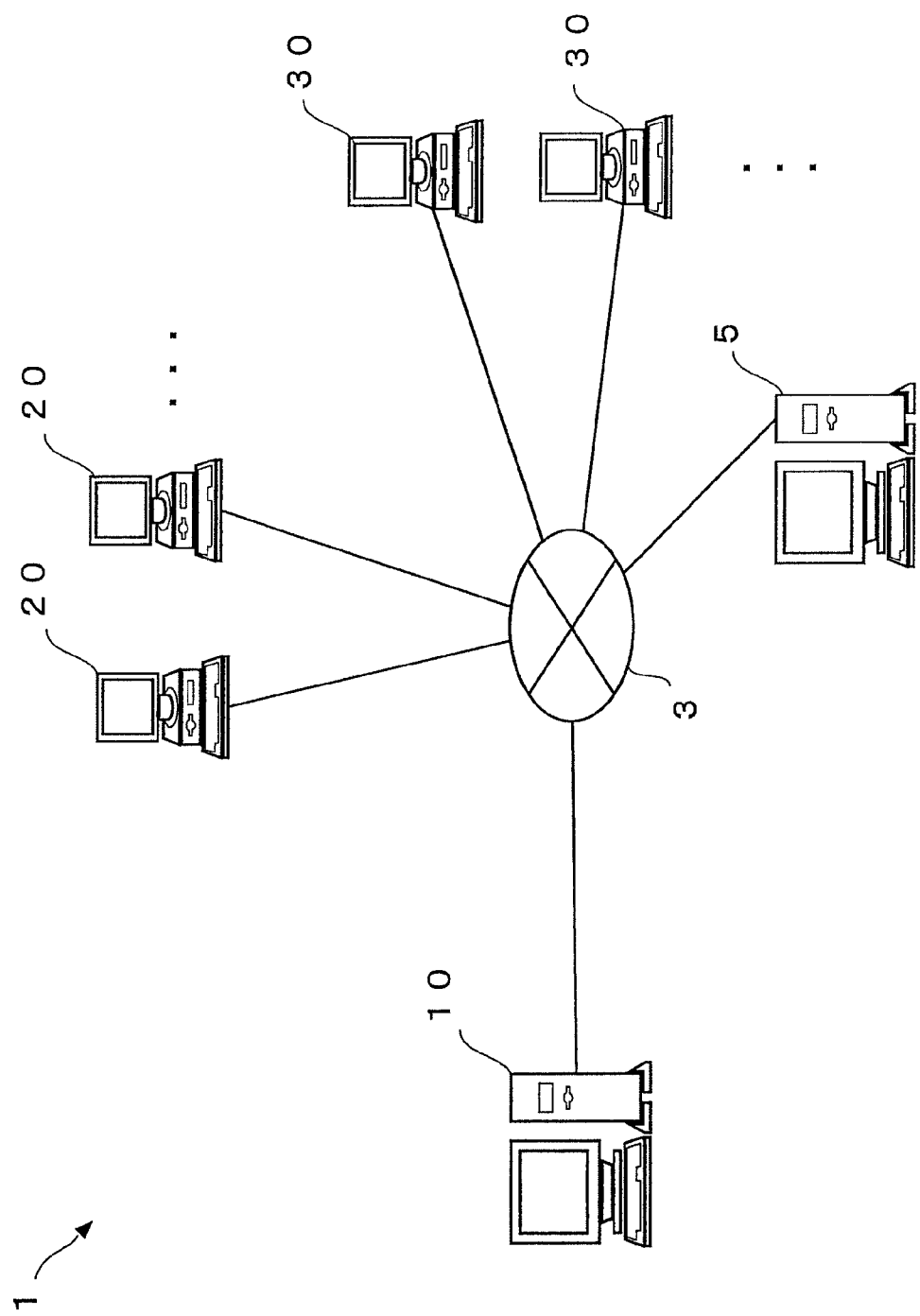
FIG. 1 is a schematic diagram showing a general configuration example of an information processing system according to an embodiment of the present invention.

FIG. 1 is a schematic diagram showing a general configuration example of an information processing system 1 according to an embodiment of the present invention.

As shown in FIG. 1, the information processing system 1 includes an information processing server 10 (an example of the information processing device) installed to operate a shopping site, shop terminal devices 20 providing product to the shopping site, and user terminals 30 of users who purchase at the shopping site.

The information processing server 10, the shop terminal devices 20, and the user terminal devices 30 can mutually transmit and receive data using, for example, TCP/IP or the like as a communication protocol through a network 3. Incidentally, the network 3 is constructed by, for example, the Internet, a private communication line (for example, CATV (Community Antenna Television)), a mobile communication network (including base stations), and gateways. The information processing server 10 is further connected to an external search server 5 through the network 3. The search server 5 provides a Web API (Application Programming Interface) of search and the like.

The shop terminal device 20 is a computer of a person who has set up a shop to provide product to the shopping site. The person who has set up a shop registers product to be dealt in through the shop terminal device 20. The shop terminal device 20 has a Web browser function and displays product to be dealt in.

The user terminal device 30 is a computer of a user who purchases product at the shopping site. The user terminal device 30 has a Web browser function and transmits a search query to the information processing server 10 or displays a search result or advertisements on the screen of the Web browser when the user searches for product.

[2. Configurations and Functions of Information Processing Server and Each Terminal Device]

(2.1 Configuration and Function of the Information Processing Server 10)

Next, the configuration and function of the information processing server 10 will be described using FIGS. 2 to 4.

Figure 2:
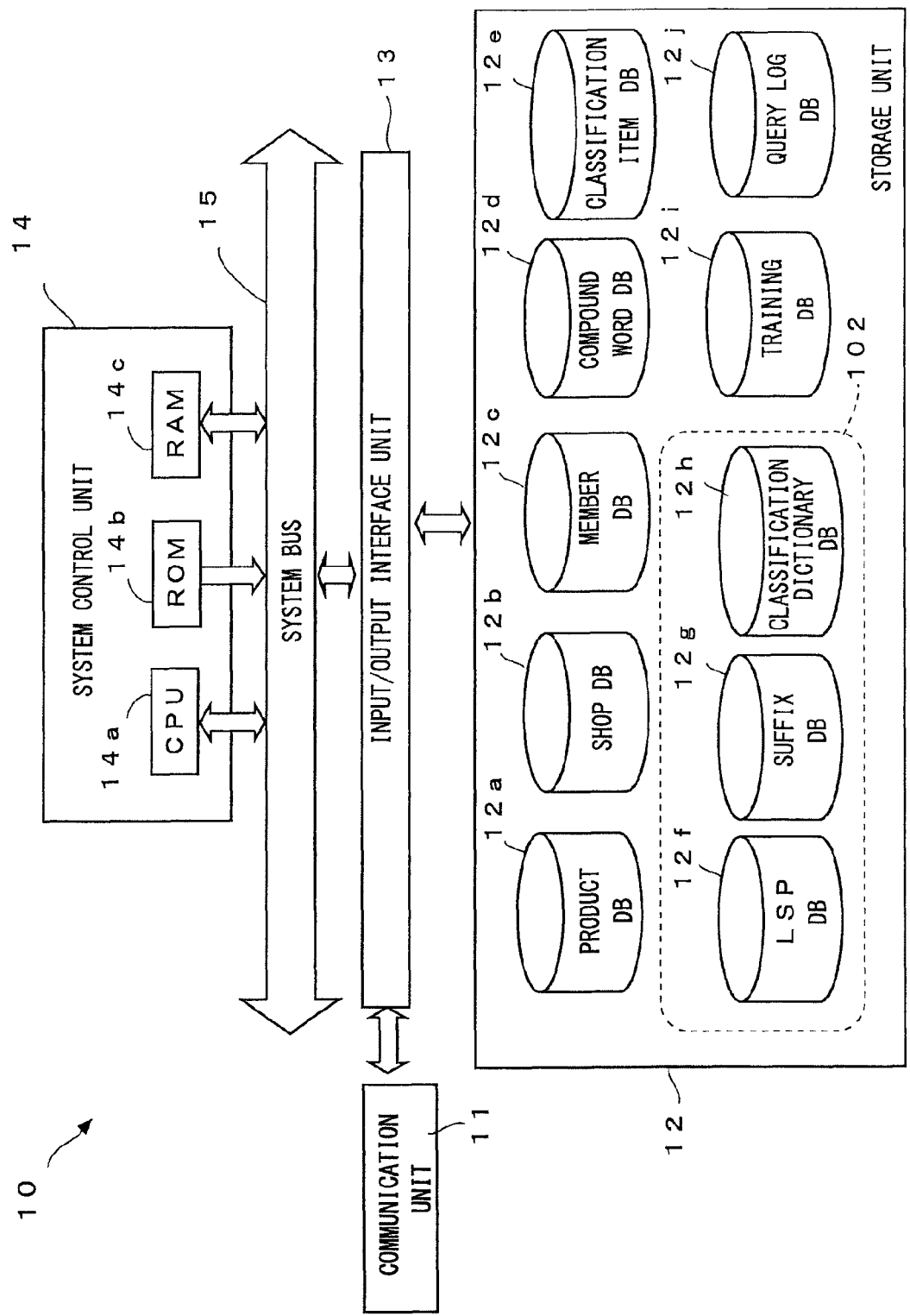
FIG. 2 is a block diagram showing an example of a general configuration of an information processing server in FIG. 1.

FIG. 2 is a block diagram showing an example of a general configuration of the information processing server 10. FIG. 3 is a schematic diagram showing an example of data stored in a training database. FIG. 4 is a schematic diagram showing an example of a query log stored in a query log database.

As shown in FIG. 2, the information processing server 10 includes a communication unit 11, a storage unit 12, an input/output interface unit 13 and a system control unit 14. Further, the system control unit 14 and the input/output interface unit 13 are connected through a system bus 15.

The communication unit 11 is connected to the network 3 to control a communication state to the shop terminal device 20 or the user terminal device 30.

The storage unit 12 (an example of a storage means) is configured by, for example, a hard disk drive or the like and stores various programs such as an operating system and a server program and files of Web pages described in markup language such as HTML. Incidentally, various programs may also be, for example, acquired from another server device through the network 3 or recorded in a recording medium and read through a drive device.

In the storage unit 12, a product database 12a (hereinafter, called a "product DB 12a") as an example of a predetermined storage means, a shop database 12b (hereinafter, called a "shop DB 12b"), a member database 12c (hereinafter, called a "member DB 12c"), a compound word database (hereinafter, called a "compound word DB 12d") storing compound words, a classification item database 12e (hereinafter, called a "classification item DB 12e"), a lexico-syntactic pattern (LSP) database 12f (hereinafter, called a "LSP-DB 12f") storing extraction patterns to acquire words or the like in a specific semantic relation, a suffix database 12g (hereinafter, called a "suffix DB 12g") storing suffixes, a classification dictionary database 12h (hereinafter, called a "classification dictionary DB 12h") as a dictionary to classify words into specific classification items, a training database 12i (hereinafter, called a "training DB 12i") storing data for machine training, a query log database 12j (hereinafter, called a "query log DB 12j") storing search keywords and the like used for searching and the like are constructed. Here, the lexico-syntactic pattern (LSP) is an extraction pattern to acquire words in a specific semantic relation.

Product information such as a product name, a type, a product image, specs, and a summary of the product introduction and advertisement information are stored in the product DB 12*a* by associating with a product ID as an identifier to identify the product. In addition, a shop ID of the shop dealing in product is stored in the product DB 12*a* by associating with the product ID. Further, a file of a product Web page described in markup language such as HTML or XML is stored in the product DB 12*a*. Also, a database for searching is constructed in the product DB 12*a* so that product can be searched for based on a search keyword.

Shop information such as a shop ID of a shop, a name, an address, a telephone number, and product information of product dealt in by the shop is registered in the shop DB 12*b*. Such shop information can be discriminated based on the shop ID for each person who has set up a shop. The product ID of product dealt in by a shop and the shop ID are associated and stored in the shop DB 12*b*.

User information such as a user ID of a user (user of the shopping site) registered as a member, a name, an address, a telephone number, a mail address, an occupation, hobbies, a purchase history, and topics or genres in which the user is interested is registered in the member DB 12*c*. In addition, a user ID, a login ID, and a password needed for the user to log in to the shopping site from the user terminal device 30 are registered in the member DB 12*c*. Here, the login ID and the password are login information used for login processing (authentication processing of the user).

A compound word formed from a base word (head) to be a base and a modifier is stored in the compound word DB 12*d* (an example of a compound word storage means). The base word is a noun (hereinafter, called a concrete noun) representing a concrete thing like a "JITENSHA" (bicycle), "HERUMETTO" (helmet), "BAGGU" (bag), "TANSU" (cabinet), and "EPURON" (apron). To describe more concrete examples with reference to the embodiments described below, the base word is a search keyword when a search of product is assumed and a word representing the product whose special topic article should be edited such as "JITENSHA" (bicycle) and "BEDDO" (bed) when the creation of a product featuring page described below is assumed. On the other hand, the modifier is a word likely to modify a concrete noun such as "KODOMO" (child), "KIZZU YOU" (for kids), "ENAMERU SEI" (made of enamel), "NIHON SEI" (made in Japan), "RAITO TSUKI" (with light), "WANPISU KATA" (one-piece type), and "BOUSUI" (waterproof). A compound word formed from such a modifier and a base word is classified based on the modifier. In the present embodiment, the compound word is grasped as a compound noun and more concretely, a compound noun matching the pattern of "noun+concrete noun" like "DENDOU JITENSHA" (power-assisted bicycle) or a compound noun matching the pattern of "noun+suffix+concrete noun" like "KODOMO YOU JITENSHA" (bicycle for children). In the case of the pattern of "MEISHI+GUSHOU MEISHI" (noun+concrete noun), "MEISHI" (noun) is a modifier and "GUSHOU MEISHI" (concrete noun) as the base word is a modifiee (more specifically, in the case of "DENDOU JITENSHA" (power-assisted bicycle), "DENDOU" (power-assisted) as a noun is a modifier and "JITENSHA" (bicycle) as a concrete noun is a base word) and in the case of the pattern of "MEISHI+SETSUBIJI+GUSHOU MEISHI" (noun+suffix+concrete noun), "MEISHI+SETSUBIJI" (noun+suffix) is a modifier and "GUSHOU MEISHI" (concrete noun) as abase word is a modifiee (more specifically, in the case of "KODOMO YOU JITENSHA" (bicycle for children), "KODOMO" (children) as a noun and "YOU" (for) as a suffix are a modifier and "JITENSHA" (bicycle) as a concrete noun is a base word). That is, in the foregoing, an example when "JITENSHA" (bicycle) is set as the base word is proposed. In addition, base words and compound words are associated and stored in the compound word DB 12*d*.

Incidentally, a compound word may also be generated by using the above patterns for product information such as the product name of the product DB 12*a*, product description and the like. When extracting a noun, processing in which a morpheme whose part-of-speech is an unknown word or a symbol-alphabet is handled as a noun and a morpheme whose part-of-speech is a noun-suffix or noun-number is not regarded as a noun may be performed by using a morphological analyzer. Further, to remove words as noise, compound words may be narrowed down to those used as many times as a predetermined number or more as search keywords.

In addition, compound words may be generated from the base word, other word, and suffix, according to the patterns of "base word+other word", "other word+base word", "base word+suffix+other word", and "other word+suffix+base word".

Classification items to classify a compound word are stored in the classification item DB 12*e* (an example of the classification item storage means). As classification items, for example, "User)" indicating for what kind of users product is intended, "Target" indicating for what target to be used, "Purpose" indicating the purpose of using product or the like, "Function" indicating the function of product or the like, "Accessory" indicating to be an accessory, "Shape" indicating the shape of product or the like, "Location" indicating the place of production of product or the like, "Company Name" indicating the selling agency of product or the like, "Material" indicating the material of product, and "Design" indicating the design of product or the like can be cited. Further, "Size", "Atmosphere", "Processing", "Usage", "Specification, "Property", and "State" can be cited as classification items. The classification item ID is attached to each classification item and each classification item is stored in the classification item. DB 12*e*. Incidentally, the classification item indicates a semantic relation established between a base word (head) and a modifier in a compound word.

Lexico-syntactic patterns storing extraction patterns to acquire a word pair in a semantic relation corresponding to each classification item are stored in the LSP-DB 12*f* (an example of the feature information storage means). If H is a base word and M is a modifier, examples of the lexico-syntactic pattern include "M YOU H" (H for M), "M TSUKI H" (H with M), "M KATA H" (M type H), "M SEI H" (H made of M), "M SAN H" (H produced in M), and "M GARA H" (M pattern H). Further, examples of the lexico-syntactic pattern include "M NO H" (H of M), "M NIOKERU H" (H in M), "M NOTAMENO H" (H for the purpose of M), "M IRI H" (H containing M), "M SEINO H" (H made of M), "M IRINO H" (H containing M), "M SOZAI NO H" (H of M material), "M GAHAITTA H" (H containing M), "M DEDEKITA H" (H made of M), "M SAIZU H" (H of M size), "TATOEBA M NADONO H" (H such as M), and "H HA M NO BUBUN DEARU" (H is a part of M). Incidentally, as the semantic relation, "TATOEBA M NADONO H" (H such as M) is an example of hyponymy relations and "H HA M NO BUBUN DEARU" (H is a part of M) is an example of the part-whole relation.

Further, examples of the lexico-syntactic patterns regarding a word X include "X SAMA" (Mr. X), "X YOU" (for X), "X MUKE" (intended for X), "X YOU" (for X), "X KATA"

(X type), "X KINOU TSUKI" (with X function), "X NOYOUNA KATACHI" (shape like X), "X NADONO KATACHI" (shape such as X), "X SAN" (produced in X), "X SHA" (X company), "X SEI" (made of X), ""BURANDO NO X (brand X), "MEKA NO X" (maker X), and "X NOYOUNA SOZAI" (material like X).

In addition, the lexico-syntactic pattern may be classified by relation. For example, the lexico-syntactic patterns "X YOU" (for X), "X MUKE" (intended for X), and "X YOU" (for X) are classified as the user relation, the lexico-syntactic pattern "X KINOU TSUKI" (with X function) is classified as the function relation, the lexico-syntactic patterns "X KATA" (X type), "X NOYOUNA KATACHI" (shape like X) and "X NADONO KATACHI" (shape such as X) are classified as the shape relation, the lexico-syntactic pattern "X SAN" (produced in X) is classified as the location relation, the lexico-syntactic patterns "X SHA" (X company), "X SEI" (made of X), ""BURANDO NO X (brand X), and "MEKA NO X" (maker X) are classified as the company relation, and the lexico-syntactic pattern "X NOYOUNA SOZAI" (material like X) is classified as the material relation.

"YOU" (for), "TSUKI" (with), "SEI" (made of), "SAN" (produced in), "KATA" (type), "BAN" (board), "BAN" (version), "GARA" (pattern), "IRO" (color) and the like are stored in the suffix DB 12g (an example of the feature information storage means) as characters of the suffix. For example, characters of the suffix are used to generate a compound word like "JITENSHA YOU HERUMETTO" (helmet for bicycle). Incidentally, in English, in addition to "for" in "helmet for bicycle", "with", "in", "for the purpose of", "made in", "made of", and "produced in" can be cited as expressions corresponding to the above suffixes.

Incidentally, the suffix is an example of an intermediate character string between a base word and another word and is a word in a suffix portion of a modifier portion with respect to a base word of a compound word. In the case of, for example, a base word H and another word X, suffix portions "YOU" (for), "TSUKI" (with), and "SEI" (made of) in the modifier portions "X YOU" (for X), "X TSUKI" (with X), and "X SEI" (made of X) in the compound words "X YOU H" (H for X), "X TSUKI H" (H with X), and "X SEI H" (H made of X) can be cited as characters of the suffix. In English, "with", "in", "for the purpose of", "made in", "made of", and "produced in" of the modifier portions "with X", "in X", "for the purpose of X", "made in X", "made of X", and "produced in X" in the compound words "H for X", "H with X", "H in X", "H for the purpose of X", "H made in X", "H made of X", and "H produced in X" can be cited as expressions corresponding to the above suffixes.

Dictionaries such as a user word dictionary of words related to users, an object word dictionary of words related to targets, a function word dictionary of words related to functions, a shape word dictionary of words related to shapes, a location word dictionary of words related to places of production, place-names and the like, a company name word dictionary of words related to corporate names and brand names, and a material word dictionary of words related to the material are recorded in the classification dictionary DB 12h (an example of the feature information storage means).

In the user word dictionary, words representing a person like "SHINIA" (senior), "JUNIA" (junior), "BEBI" (baby), "User", and "DANSEI" (male) are stored. The user word dictionary is used when the classification item of "YUSA" (user) is obtained.

In the object word dictionary, words representing an object like "BIHAKU BIYOUEKI" (skin-whitening liquid foundation), "HEDDO DORESU" (headdress), and "IROGAMI" (colored paper) are stored. The object word dictionary is used when the classification item of "Target", the classification item of "Accessory", or the classification item of "Shape" is obtained.

In the function word dictionary, words representing a function like "SHOUSHU" (deodorization), "TAISHIN" (earthquake-proof), "SAIZU CHOUSEI" (size adjustment), and "HORUDO" (hold) are stored. The function word dictionary is used when the classification item of "Function" is obtained.

In the shape word dictionary, words representing a shape like "MIKAZUKI" (crescent) and "DAEN" (ellipse) are stored. The shape word dictionary is used when the classification item of "Shape" is obtained.

In the location word dictionary, words representing a place-name like "TOKYO" (Tokyo), "HIROSHIMA" (Hiroshima), "ITARIA" (Italy), and "ROMA" (Rome) are stored. The location word dictionary is used when the classification item of "Location" is obtained.

In the company name word dictionary, words representing a corporate name, brand name or the like are stored. The company name word dictionary is used when the classification item of "Company Name" is obtained.

In the material word dictionary, words representing a material like "KAWA" (leather), "GOMU" (rubber), "GARASU" (glass), and "KAMI" (paper) are stored. The material word dictionary is used when the classification item of "Material" is obtained.

In addition, the classification dictionary DB 12h includes a dictionary of a morphological analysis system that classifies words in each language like a Japanese morphological analysis system. The classification dictionary DB 12h also includes a dictionary in which expressions representing a person are collected to determine whether a word represents a person. Further, the classification dictionary 12h includes a database related to dependency of each language and data on the frequency of appearance of words or phrases is also present in the database.

Next, as shown in FIG. 3, the classification item, lexico-syntactic patterns corresponding to the classification item, and compound words for training are associated and stored in the training DB 12i (an example of the classification item storage means). In the training DB 12i, information about a base word (underlined in the figure) as a head and a modifier portion in each compound word for training are stored.

Search keywords used by users for a search are stored in the query log DB 12j. As shown in FIG. 4, the number of times of use is also counted and stored in the query log DB 12j together with the search keyword used for a search. Further, as shown in FIG. 4, if the search keyword used for a search is "HERUMETTO JITENSHA" (helmet bicycle), a search keyword is stored in the query log DB 12j by setting "HERUMETTO" (helmet) as the base word and "JITENSHA" (bicycle) as the other word and combining the base word and the other word. Incidentally, if the search keyword used for a search is "HERUMETTO" (helmet), only the base word is stored. If the search keyword used for a search is "JITENSHA HERUMETTO" (bicycle helmet), "HERUMETTO" (helmet) may be set as the base word and "JITENSHA" (bicycle) as the other word before being distributed out and stored in the query log DB 12j.

The LSP-DB 12f, the suffix DB 12g, and the classification dictionary DB 12h form a feature information database (hereinafter, called "feature information DB 102") (an example of the feature information storage means) storing feature information about a feature that provides a clue to classify a compound word. In the feature information DB 102, the character string of a modifier, part-of-speech, and meaning class name are also stored as feature information necessary to construct a classification model.

The feature is a clue to classify a compound word into one of the classification items and an element indicating characteristics of the compound word. Examples of feature information about a feature include a suited lexico-syntactic pattern, classification dictionary in which modifier portions are registered, character string of a modifier portion, part-of-speech of a modifier portion, suffix at the end of a modifier portion, and meaning class to which a modifier portion belongs. A compound word can be characterized by the above feature information. Incidentally, to acquire the meaning class, information of an existing thesaurus such as a classification lexicon table is used.

A matrix of a feature vector is stored in the feature information DB 102. The feature vector is a multi-dimensional vector (characteristic value vector) having characteristic values of a compound value as values thereof. A feature vector is configured by a matrix of a feature vector including a lexico-syntactic pattern portion of the feature vector, a modification portion of the feature vector, a part-of-speech portion of the feature vector, a suffix portion of the feature vector, and a meaning class portion of the feature vector.

The lexico-syntactic pattern portion of a feature vector corresponds to each lexico-syntactic pattern and occupies, for example, as many dimensions as the predetermined number of lexico-syntactic patterns. The portion of each dimension of the lexico-syntactic pattern portion corresponds to an individual lexico-syntactic pattern.

The modification portion of a feature vector corresponds to each character string of a modifier and occupies as many dimensions as the predetermined number of types of the modifier character string. Each dimension portion of the modification portion corresponds to an individual character string.

The part-of-speech portion of a feature vector corresponds to the part-of-speech of a modifier and occupies as many dimensions as the predetermined number of part-of-speeches of the modifier. The portion of each dimension of the part-of-speech portion corresponds to an individual part-of-speech.

The suffix portion of a feature vector corresponds to the suffix at the end of a modifier and occupies, for example, as many dimensions as the predetermined number of types of the suffix. Incidentally, NULL is assumed when there is no suffix. The portion of each dimension of the suffix portion corresponds to an individual suffix.

The meaning class portion of a feature vector corresponds to the meaning class in a classification lexicon table and occupies, for example, as many dimensions as the predetermined classification number of meaning classes. The portion of each dimension of the meaning class portion corresponds to an individual meaning class. Here, the classification lexicon table is a thesaurus in which words are classified and distributed out by meaning. The classification lexicon table is stored in the feature information DB 102.

The feature vector of a compound word is obtained by applying the compound word to the matrix of a feature vector and obtaining the feature value of each component of the feature vector, that is, the feature value of each portion of the feature vector. The matrix of the feature vector is also an example of feature information.

Here, using feature information for a compound word means, for example, using feature information about elements indicating characteristics of the compound word. Examples of using feature information for a compound word include a case when an feature vector is used for a compound word to expand the compound word into an feature vector to obtain each component, when the suffix such as "YOU" (for) and "TSUKI" (with) is used for a compound word to determine whether the suffix such as "YOU" (for) is present in the compound word, when a lexico-syntactic pattern is used for a compound word to extract a predetermined word or character string matching the lexico-syntactic pattern from the compound word or determine whether the compound word matches the lexico-syntactic pattern, or when a classification dictionary is used for a compound word to determine whether a word or character string in a predetermined portion of the compound word is present in the classification dictionary.

The input/output interface unit 13 performs interface processing between the communication unit 11 and the memory unit 12, and the system control unit 14.

The system control unit 14 is formed with, for example, a CPU (Central Processing Unit) 14a, a ROM (Read Only Memory) 14b and a RAM (Random Access Memory) 14c (an example of the storage means). Then, the system control unit 14 functions as a compound word classification means that distributes a compound word into classification items by various programs stored in the ROM 14b or the storage unit 12 being read and executed by the CPU 14a.

(2.2 Configuration and Function of the Shop Terminal Device 20)

Next, the configuration and function of the shop terminal device 20 will be described using FIG. 5.

Figure 5:
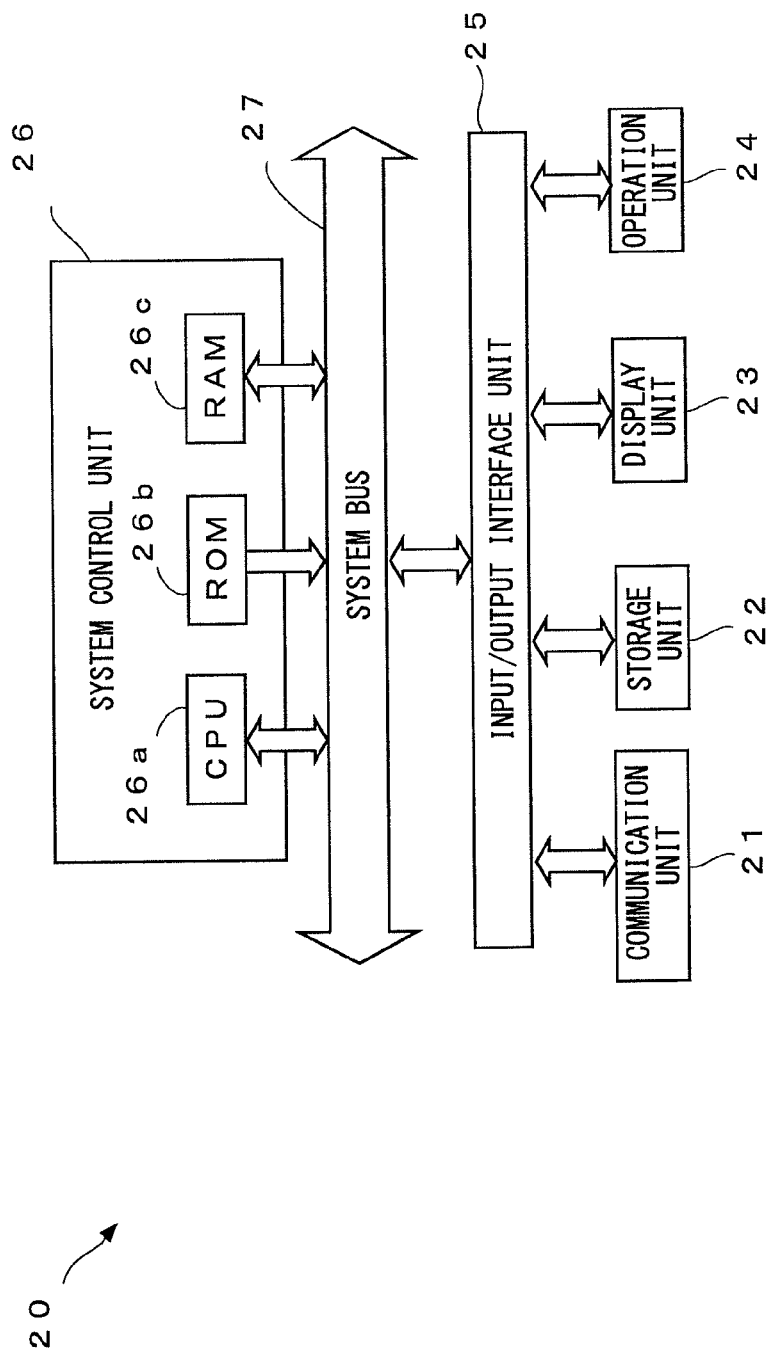
FIG. 5 is a block diagram showing an example of the general configuration of a shop terminal device in FIG. 1.

FIG. 5 is a block diagram showing an example of the general configuration of the shop terminal device 20.

As shown in FIG. 5, the shop terminal device 20 functioning as a computer is, for example, a personal computer or a mobile terminal such as a portable wireless phone including a smartphone and PDA and includes a communication unit 21, a storage unit 22, a display unit 23, an operation unit 24, an input/output interface unit 25, and a system control unit 26. Further, the system control unit 26 and the input/output interface unit 25 are connected through a system bus 27.

The communication unit 21 controls communication with the information processing server 10 through the network 3. Incidentally, when the shop terminal device 20 is a mobile terminal device, the communication unit 21 has a wireless communication function to connect to a mobile communication network of the network 3.

The storage unit 22 is configured by, for example, a hard disk drive or the like and stores an operating system and programs such as a Web browser program and Web browser toolbar.

The display unit 23 (an example of the display means) is configured by, for example, a liquid crystal display device or EL (Electro Luminescence) device.

The operation unit 24 is configured by, for example, a keyboard, mouse, and the like. The user inputs a response through the operation unit 24. Incidentally, if the display unit 23 is a display panel of the touch switch method like a touch panel, the operation unit 24 acquires position information of the display unit 23 where the user touches or approaches.

The input/output interface unit 25 is an interface between the communication unit 21 and the storage unit 22, and the system control unit 26.

The system control unit 26 includes, for example, a CPU 26a, a ROM 26b, and a RAM 26c. The system control unit 26 reads and executes various programs stored in the ROM 26b, the RAM 26C, or the storage unit 22 through the CPU 26a. For example, the system control unit 26 functions as a Web browser by executing a Web browser program.

(2.3 Configuration and Function of the User Terminal Device 30)

Next, the configuration and function of the user terminal device 30 will be described using FIG. 6.

Figure 6:
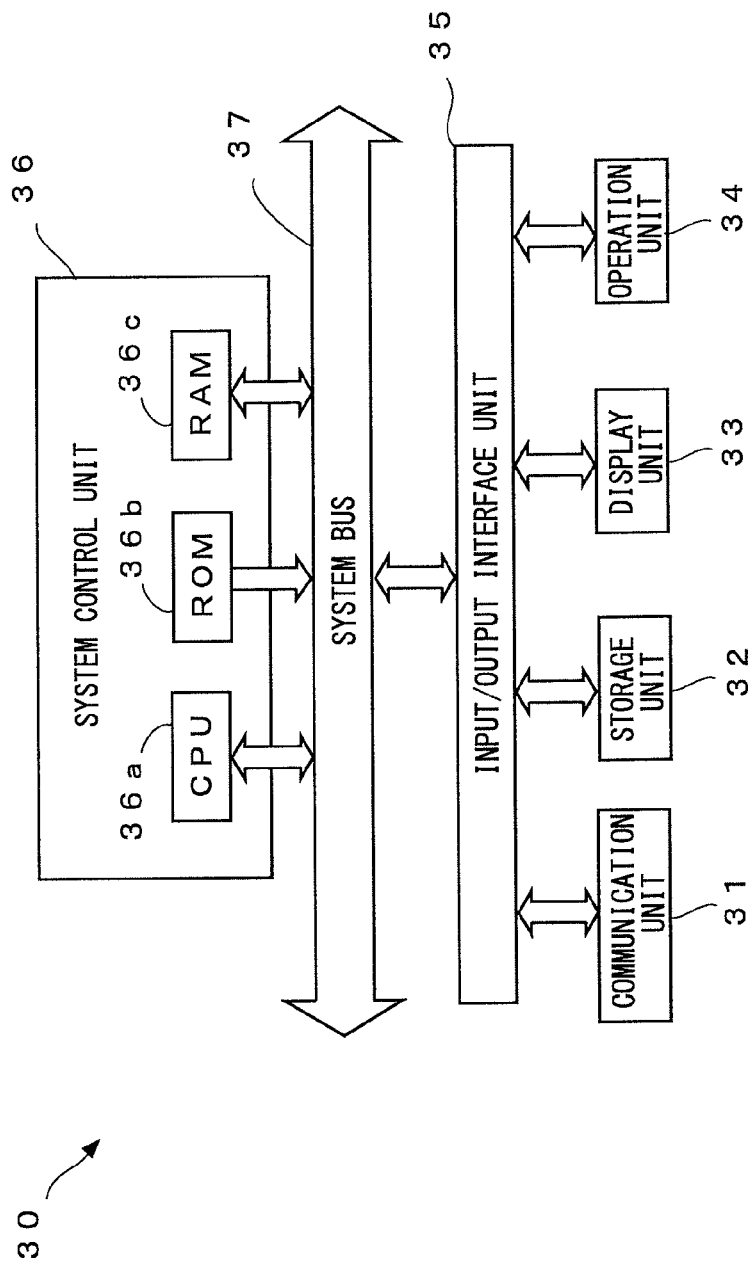
FIG. 6 is a block diagram showing an example of the general configuration of a user terminal device in FIG. 1.

FIG. 6 is a block diagram showing an example of the general configuration of the user terminal device 30.

As shown in FIG. 6, the user terminal device 30 functioning as a computer is, for example, like the shop terminal device 20, a personal computer or a mobile terminal such as a portable wireless phone including a smartphone and PDA and includes a communication unit 31, a storage unit 32, a display unit 33 (an example of the display means), an operation unit 34, an input/output interface unit 35, and a system control unit 36. Further, the system control unit 36 and the input/output interface unit 35 are connected through a system bus 37. Incidentally, the configuration and function of the user terminal device 30 are approximately the same as those of the shop terminal device 20 and thus, a detailed description thereof is omitted. Incidentally, a Web page to search for product and also a Web page of search results are displayed in the display unit 33 by a Web browser.

[3. Operation of First Embodiment of Information Processing System]

Next, the operation of a first embodiment of the information processing system 1 according to the first embodiment of the present invention will be described using FIGS. 7 to 9.

Figure 7:
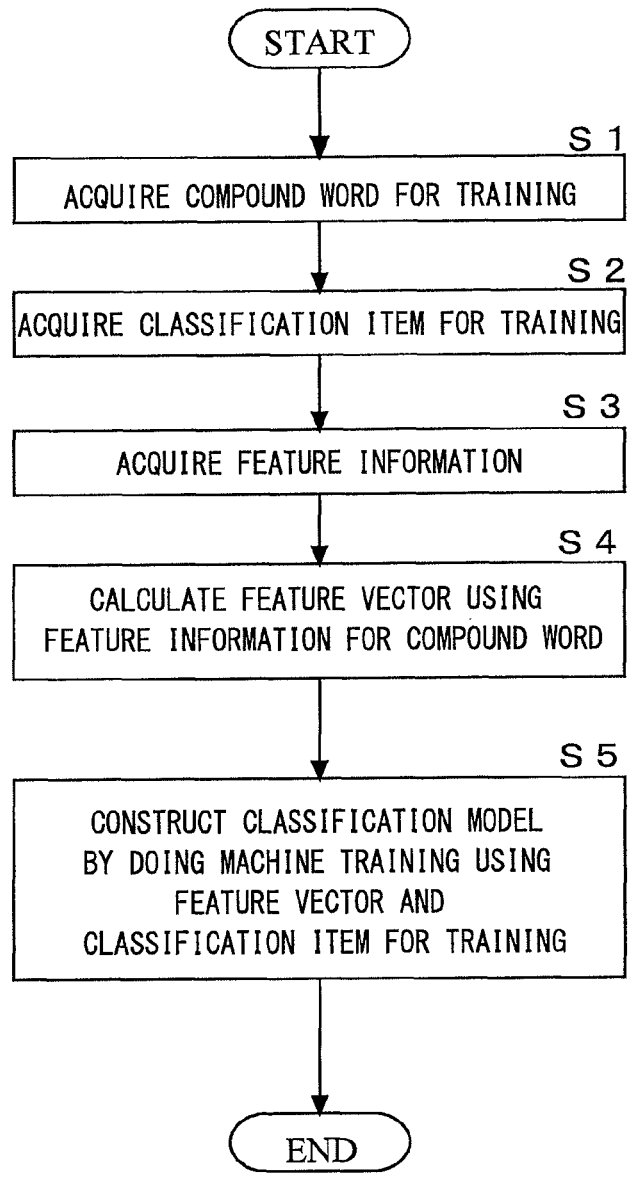
FIG. 7 is a flow chart showing an operation example of model construction by the information processing server in FIG. 1.

FIG. 7 is a flow chart showing an operation example of model construction by the information processing server 10. FIG. 8 is a flow chart showing an operation example according to the first embodiment of the information processing server 10. FIG. 9 is a schematic diagram showing an example of a search result by the information processing server 10.

(3.1 Operation Example of Classification Model Construction by Information Processing Server)

First, an operation example of the classification model construction will be described using FIG. 7.

As shown in FIG. 7, the information processing server 10 acquires a compound word for training (step S1). More specifically, the system control unit 14 of the information processing server 10 acquires a compound word for training by referring to the training DB 12*i* of the storage unit 12. Further, the system control unit 14 acquires a base word and a modifier portion of the compound word for training from the training DB 12*i*. For example, as shown in FIG. 3, the system control unit 14 acquires "BESUTO" (vest) as the base word of a compound word and "FA" (fur) as the modifier portion.

Thus, the information processing server 10 functions as an example of a training compound word acquisition means that acquires a compound word for training.

Next, the information processing server 10 acquires a classification item for training (step S2). More specifically, the system control unit 14 of the information processing server 10 acquires a classification item for training from the training DB 12*i* of the storage unit 12. For example, as shown in FIG. 3, the system control unit 14 acquires a classification item "ZAIRYOU" (material) of the compound word "FA BESUTO" (fur vest).

Thus, the information processing server 10 functions as an example of a training classification item acquisition means that acquires a classification item for training corresponding to a compound word for training acquired by the training compound word acquisition means by referring to a classification item storage means.

Next, the information processing server 10 acquires feature information (step S3). More specifically, the system control unit 14 of the information processing server 10 acquires a matrix of a feature vector by referring to the feature information DB 102. The system control unit 14 acquires a matrix of the above feature vector including the lexico-syntactic pattern portion of the feature vector, the modification portion of the feature vector, the part-of-speech portion of the feature vector, the suffix portion of the feature vector, and the meaning class portion of the feature vector.

Next, the information processing server 10 calculates a feature vector for the compound word using the feature information (step S4). More specifically, the system control unit 14 of the information processing server 10 calculates each component of a feature vector of the compound word containing the base word, using the matrix of the above feature vector for the compound word, and expands the compound word into the feature vector.

When, for example, the component of the lexico-syntactic pattern portion of an feature vector is obtained, the system control unit 14 generates compound words (for example, "FA NO BESUTO" (vest of fur), "FA SEI BESUTO" (vest made of fur), . . . ) in which the lexico-syntactic pattern of each component is applied to the base word (for example, "BESUTO" (vest)) of a compound word for training and the modifier portion (for example, "FA" (fur)). Incidentally, the modifier portion becomes "WOKINGU YOU" (for walking) like a compound word "WOKINGU YOU SOKKUSU" (socks for walking), but a compound word is generated by setting "WOKINGU" (walking) obtained by omitting the suffix "YOU" (for) as M and applying the lexico-syntactic pattern.

As the lexico-syntactic patterns, as shown in FIG. 3, all lexico-syntactic patterns corresponding to the classification items are used. Incidentally, instead of using all lexico-syntactic patterns as shown in FIG. 3, lexico-syntactic patterns to be used may be limited to lexico-syntactic patterns corresponding to each classification item to which the compound word for training belongs. Then, the system control unit 14 searches a predetermined database to determine whether as many generated compound words as a predetermined number or more are present. If as many generated compound words as the predetermined number or more are present, "1" is set to the component corresponding to the lexico-syntactic pattern and otherwise, "0" is set. Incidentally, the predetermined number may be the number of hits when the search server 5 is used or the number of hits in the product DB 12*a*, in case that a generated compound word is set as the search keyword.

To obtain the component of the modification portion of an feature vector, the system control unit 14 applies the modifier portion of a compound word for training to each character string of the modifier and sets the component where applied to "1" and the component where not applied to "0".

To obtain the component of the part-of-speech portion of a feature vector, the system control unit 14 determines the part-of-speech of the modifier portion of the compound word for training by morphological analysis or by using a database on part-of-speeches. The system control unit 14 sets the component where the part-of-speech corresponds to "1" and the component where the part-of-speech does not correspond to "0".

To obtain the component of the suffix portion of a feature vector, the system control unit 14 extracts a word at the end or at the start of the modifier portion of the compound word for training. The system control unit 14 determines to which suffix of the suffix portion of a feature vector the extracted word corresponds and sets the component of the corresponding suffix to "1" and the component of the non-corresponding suffix to "0".

To obtain the component of the meaning class portion of an feature vector, the system control unit 14 determines to which meaning class the modifier portion of the compound word for training belongs by referring to the classification lexicon table and sets the component of the corresponding meaning class to "1" and the component of the non-corresponding meaning class to "0".

In this manner, a feature vector for each compound word for training is calculated.

Next, the information processing server 10 does machine training using feature vectors and classification items for training to construct a classification model (step S5). More specifically, the system control unit 14 of the information processing server 10 constructs a classification model by inputting each of the calculated feature vectors and setting classification items for training as correct solutions (teacher's data) to cause machine training. Methods of machine training include, for example, MIRA (Margin Infused Relaxed Algorithm), the decision tree, and a combination of a plurality of SVM (Support vector machine). Incidentally, the classification model is represented by a weighting function, a matrix of weight or the like. As the classification model, a classification result of the compound word including the base word is output by calculating a product of a weighting function or the like and a feature vector (input) of a compound word.

Thus, the information processing server 10 functions as an example of a classification model construction means that constructs a classification model to distribute a compound word containing a base word into classification items from the compound word for training acquired by the training compound word acquisition means by doing machine training using an feature vector of the compound word for training generated by the feature vector generation means applying feature information and classification items for training acquired by the training classification item acquisition means.

(3.2 Operation Example of Search Result Classification in Information Processing System)

Next, an operation example of classifying a search result using a constructed classification model will be described using FIGS. 8 and 9.

First, the user searching for product inputs, for example, "HERUMETTO" into a product search Web page displayed in the display unit 33 of the user terminal device 30. When the search button of the Web page is clicked, the user terminal device 30 transmits the search keyword to the information processing server 10.

Figure 8:
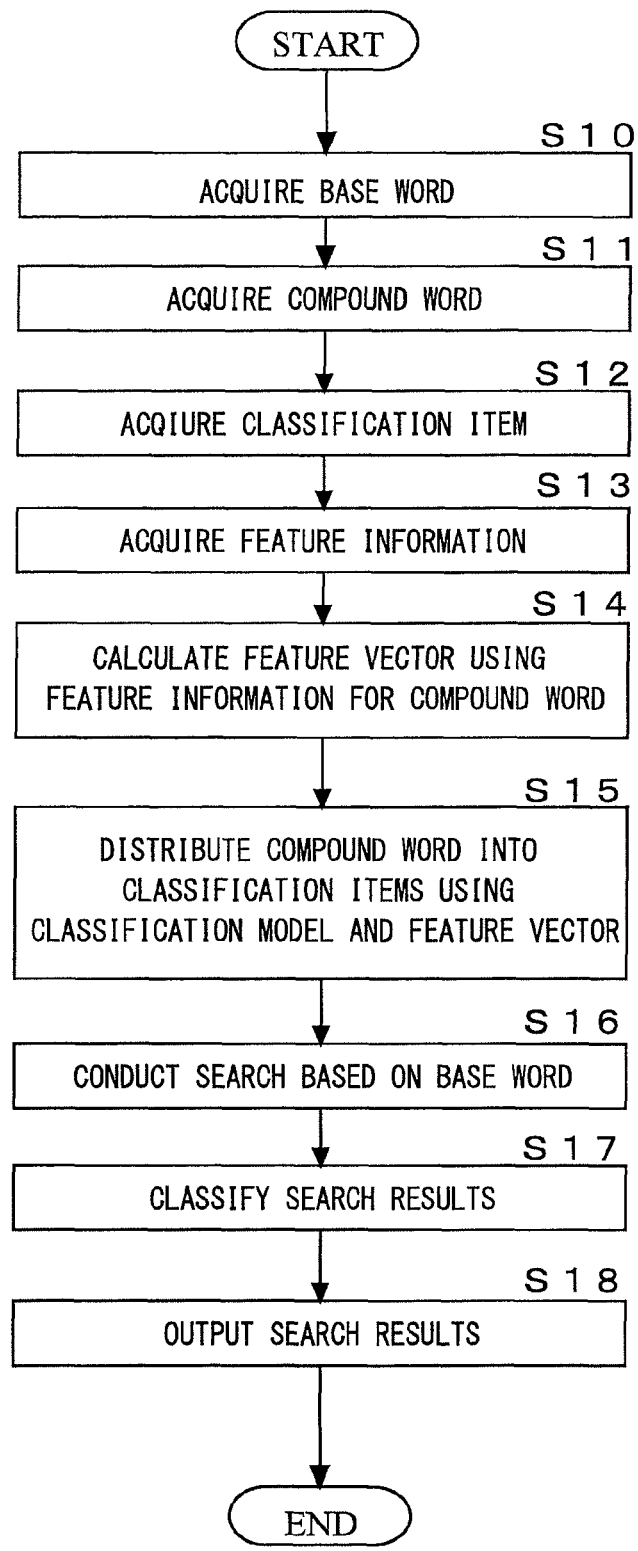
FIG. 8 is a flow chart showing an operation example according to a first embodiment of the information processing server in FIG. 1.

As shown in FIG. 8, the information processing server 10 acquires a base word (step S10). More specifically, the system control unit 14 of the information processing server 10 receives a search keyword from the user terminal device 30, temporarily stores the keyword in the storage unit 12 or the RAM 14c as examples of the storage means, and then acquires the received search keyword from the storage unit 12 or the RAM 14c as a base word. Incidentally, the information processing server 10 may also acquire a keyword ranked in the top at the shopping site as a base word. In addition, the information processing server 10 may acquire a predetermined base word related to a special topic article to build a special topic page.

Thus, the information processing server 10 functions as an example of a base word acquisition means that acquires a base word to be a base. The information processing server 10 also functions as an example of the base word acquisition means that acquires a search keyword from the user terminal device as a base word.

Next, the information processing server 10 acquires a compound word (step S11). More specifically, the system control unit 14 of the information processing server 10 acquires a compound word related to the acquired base word by referring to the compound word DB 12d as an example of the compound word storage means. For example, the system control unit 14 acquires a compound word like "KODOMO YOU HERUMETTO" (helmet for children) and "JITENSHA YOU HERUMETTO" (helmet for bicycle) related to the base word "HERUMETTO" (helmet). Incidentally, the remaining portion after removing the base word from the compound word is the modifier portion like "KODOMO YOU" (for children) and "JITENSHA YOU" (for bicycle). In addition, the compound word may be the base word itself.

Thus, the information processing server 10 functions as an example of a compound word acquisition means that acquires a compound word in which a base word acquired by the base word acquisition means becomes a modifiee from the compound word storage means.

Next, the information processing server 10 acquires classification items (step S12). More specifically, the system control unit 14 of the information processing server 10 acquires predetermined classification items (for example, "User", "Target", "Purpose", "Function", "Accessory", "Shape", "Location", "Company Name", "Material", and "Design") by referring to the classification item DB 12e.

Thus, the information processing server 10 functions as an example of the classification item acquisition means that acquires a classification item to classify a compound word acquired by the compound word acquisition means from the classification item storage means.

Next, the information processing server 10 acquires feature information (step S13). More specifically, like in step S3, the system control unit 14 of the information processing server 10 acquires a matrix of a feature vector by referring to the feature information DB 102.

Thus, the information processing server 10 functions as an example of a feature information acquisition means that acquires feature information about a feature that provides a clue to classify a compound word acquired by the compound word acquisition means by referring to a feature information storage means.

Next, the information processing server 10 calculates a feature vector for the compound word using the feature information (step S14). More specifically, like in step S4, the system control unit 14 of the information processing server 10 calculates a feature vector for the compound word containing a base word using the feature information.

Thus, the information processing server 10 functions as an example of a feature vector generation means that generates a feature vector of a compound word using feature information for the compound word.

Next, the information processing server 10 distributes each compound word into classification items using a classification model and a feature vector (step S15). More specifically, like in step S4, the system control unit 14 of the information processing server 10 calculates each component of a feature vector for each compound word. Then, the system control unit 14 distributes each compound word into classification items using the classification model constructed in step S5 and the feature vector of each compound word. For example, "KODOMO YOU HERUMETTO" (helmet for children), "OTONA YOU HERUMETTO" (helmet for adults) and the like are distributed into the classification item "User", "JITENSHA YOU HERUMERTTO" (helmet for bicycle), "BAIKU YOU HERUMETTO" (helmet for motorbike) and the like are distributed into the classification item "Target", and "BOUSAI YOU HERUMETTO" (helmet for disaster prevention), "YAKYU YOU HERUMETTO" (helmet for baseball) and the like are distributed into the classification item "Purpose". Incidentally, a compound word that does not fit to any classification item is distributed into "Others". Incidentally, the information processing server 10 may distribute the base word itself into the classification item using the classification model.

Thus, the information processing server 10 functions as an example of the compound word classification means that distributes a compound word containing a base word into a classification item acquired by the classification item acquisition means using a classification model generated in advance and feature information acquired by the feature information acquisition means for the compound word acquired by the compound word acquisition means. The information processing server 10 also functions as an example of the compound word classification means that distributes a compound word containing a base word into a classification item using a classification model constructed by the classification model construction means and a feature vector of the compound word acquired by the compound word acquisition means.

Next, the information processing server 10 conducts a search based on the base word (step S16). More specifically, the system control unit 14 of the information processing server 10 conducts a search using the base word as a search keyword by referring to the product DB 12*a* and acquires a search result (an example of base word related information) such as the product name, product image and the like obtained as hits in the search. Incidentally, base word related information includes elements of a search result and also elements like individual special topic targets when a special topic page is built. As such elements, for example, individual search result targets and special topic targets can be cited and in the case of a product search, individual product obtained as hits in a search based on a predetermined search keyword can be cited. The system control unit 14 of the information processing server 10 may acquire a search result by the search server 5 through the network 3. In addition, the information processing server 10 may acquire base word related information about a predetermined base word related to a special topic article to build a special topic page. In a special topic article of "JITENSHA" (bicycle), for example, product names (an example of base word related information) of product to be sold in connection with "JITENSHA" (bicycle) are acquired in advance. Also, search results using such product names as search keywords may be used as base word related information.

Thus, the information processing server 10 functions as an example of a base word related information acquisition means that acquires base word related information containing a plurality of elements related to the base word based on the base word. The information processing server 10 also functions as an example of the base word related information acquisition means that acquires a search result by conducting a search based on a search keyword.

Next, the information processing server 10 classifies a search result (step S17). More specifically, the system control unit 14 of the information processing server 10 compares a product name as a hit in the search and classified compound words and assigns the classification item of a compound word that is the same as or similar to the product name. Then, the system control unit 14 classifies the search result according to the assigned classification item. For example, in a Web page 40, as shown in FIG. 9, a classification item region 42 corresponding to each classification item is provided in a related product region 41. The classification item region 42 has a classification item name 42*a* attached thereto and an image 42*b* of each product in the search result arranged therein. A name 42*c* of the modifier portion of a compound word is attached to the lower neighborhood of each of the images 42*b*. Incidentally, a search result of the product name that does not fit to any of the predetermined classification items or a search result of the product name corresponding to the classification item "Others" is displayed in a search result region 43.

When a compound word is acquired based on text to be searched, the classification in step S17 is sufficient, but if the text to be searched and the source from which a compound word is acquired are different, even if a classification item is present, a search result may not be classified into the classification item and thus, such a classification item may not be displayed.

The system control unit 14 generates the Web page 40 described in HTML or the like.

Incidentally, the order of arranging images in the classification item region 42 may be, as shown in Formula (6) stated below, in descending order of score as a function of the base word, suffix, and other words. The system control unit 14 calculates scores of Formula (6) for compound words "KODOMO YOU HERUMETTO" (helmet for children), "OTONA YOU HERUMETTO" (helmet for adults), . . . and causes each of the classification item regions 42 to display information about compound words of top five scores of Formula (6).

Thus, the information processing server 10 functions as an example of a base word related information classification means that classifies each of at least a portion of elements contained in base word related information acquired by the base word related information acquisition means, into one of classification items in accordance with a classification result by the compound word classification means. The information processing server 10 also functions as an example of the base word related information classification means that classifies each of at least a portion of elements contained in a search result searched by the base word related information acquisition means, into one of classification items in accordance with a classification result by the compound word classification means.

Incidentally, the information processing server 10 may acquire a search result based on a base word (an example of a first search result using a base word as a search keyword) and a search result based on each compound word (an example of a second search result using a compound word as a search keyword) to display the search result based on each compound word (an example of the second search result) in the related product region 41 and a search result (an example of at least a portion of the first search result) obtained by deleting a portion common to the search result based on the compound word from the search result based on the base word (an example of the first search result) in the search result region 43. More specifically, the information processing server 10 compares elements (individual product or the like) of search results obtained as hits in a search in the first search result and the second search result, and deletes elements that are the same as elements in the second search result from elements in the first search result.

For example, the information processing server 10 removes search results of compound words such as the search keywords "KODOMO YOU HERUMETTO" (helmet for children) and "JITENSHA YOU HERUMETTO" (helmet for bicycle) from a search result of the search keyword "HERUMETTO" (helmet) by comparing URL (Uniform Resource Locator), product names or the like of elements of search results and deleting the same elements. Incidentally, when acquiring a first search result, the above processing may be omitted by generating a search formula that deletes each compound word in the search based on a base word. Further, the information processing server 10 arranges a product image as a first hit in a search result of the compound word "KODOMO YOU HERUMETTO" (helmet for children), a product image as a first hit in a search result of the compound word "OTONA YOU HERUMETTO" (helmet for adults) and the like as the images 42*b* in the related product region 41. Top 10 hits of a search result based on each compound word may be displayed when the image 42*b* or the name 42*c* of the modifier portion is clicked. As an example of the compound word, among related-words related to a base word, a related-word having a suffix like "KODOMO YOU HERUMETTO" (helmet for children) will be called a typed related-word.

Figure 9:
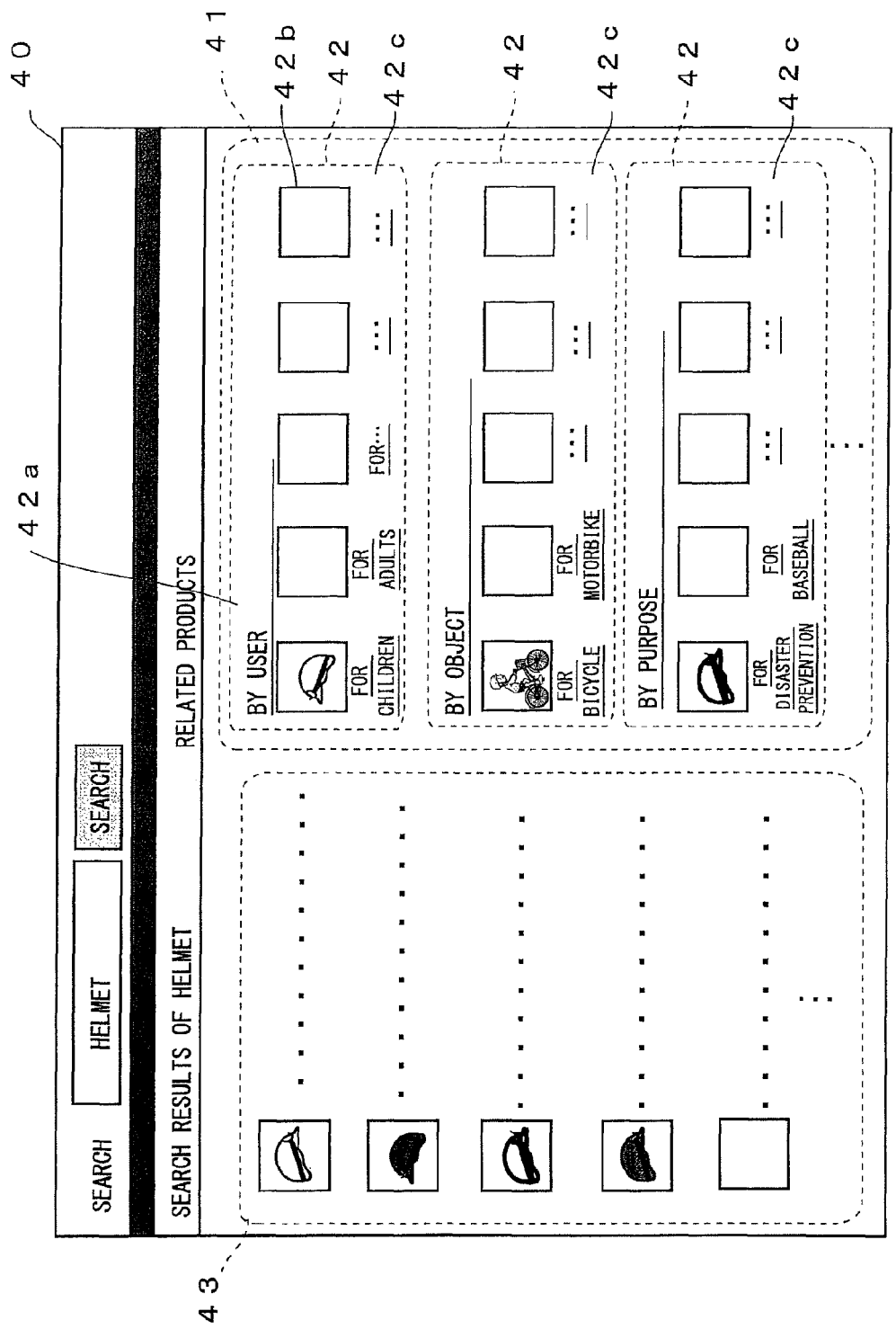
FIG. 9 is a schematic diagram showing an example of a search result in the information processing server in FIG. 1.

As shown in FIG. 9, the information processing server 10 may generate the Web page 40 (an example of search result information) described in HTML or the like to cause the display unit 33 of the user terminal device 30 to display by distinguishing a portion of the first search result (the search result region 43) and the second search result (the related product region 41). In the Web page 40, a portion of the first search result (the search result region 43) and the second search result (the related product region 41) are displayed in distinguished regions.

Thus, the information processing server 10 functions as an example of a search result acquisition means that acquires a first search result using a base word as a search keyword and a second search result using a compound word as a search keyword. The information processing server 10 also functions as an example of a search result information generation means that generates search result information so that at least a portion of a first search result and a second search result acquired by the search result acquisition means are made to be distinguished and displayed on the screen of a display means. The information processing server 10 also functions as an example of the search result information generation means that generates search result information so that a search result obtained by removing a portion of a second search result from a first search result is made to be displayed at least as a portion of the first search result.

Next, the information processing server 10 outputs the search result (step S18). More specifically, the system control unit 14 of the information processing server 10 transmits information about the Web page 40 to the user terminal device 30 as the search result. Then, the system control unit 36 of the user terminal device 30 receives search result information and displays the Web page 40 as shown in FIG. 9 in the display unit 33.

Thus, the information processing server 10 functions as an example of an output means that outputs base word related information classified by the base word related information classification means.

According to the present embodiment described above, a base word to be abase (for example, a search keyword), a compound word in which the base word becomes a modifiee, classification items to classify the compound word, and feature information (for example, a matrix of an feature vector) about an feature that provides a clue to classify the compound word are acquired, the compound word containing the base word is distributed into a classification item using a classification model (classification model constructed by machine training) generated in advance and the feature information (for example, an feature vector calculated by using a matrix of an feature vector for the compound word), base word related information based on the base word and containing a plurality of elements related to the base word is acquired (for example, a search result based on a search keyword is acquired), each of at least a portion of elements contained in the base word related information is classified into one of the classification items in accordance with a result of the classification, and the classified base word related information is output to classify the base word related information according to classification item and therefore, mixing of the base word related information is distributed out based on the classification item so that a display that is easy for the user to view can be provided.

When a compound word for training is acquired, classification items for training corresponding to the acquired compound word for training are acquired, a classification model is constructed by doing machine training using an feature vector of the compound word for training generated from the acquired compound word for training and the classification items for training, an feature vector of the compound word is generated using feature information for the acquired compound word, and the compound word containing a base word is distributed using the constructed classification model and feature vector of the acquired compound word, the classification model to provide a display that is easy for the user to view can be realized by machine training with high precision. More specifically, when compared with a case of heuristic training, various features can be considered by using machine training so that high precision can be realized and various kinds of information can be effectively used for classification.

When classification items into which compound words are distributed are output to the user terminal device 30 from among classification items into which compound words are distributed to cause the user to select a specific classification item, a selection result of the classification items is acquired from the user terminal device 30, and base word related information acquired based on the acquired selection result of the classification items and abase word is classified in accordance with a classification result, a display that is easy for the user to view user-desired information in accordance with the user's selection can be provided.

When a search keyword is acquired from the user terminal device 30 as a base word, a search result is acquired by conducting a search based on the search keyword, and the search result obtained by conducting a search is classified according to classification item, a display that is easy for the user to view information searched for by the user can be provided.

By acquiring a first search result using a base word as a search keyword and a second search result using a generated compound word as a search keyword and generating the Web page 40 (an example of search result information) so that at least a portion of the acquired first search result and the second search result are made to be distinguished and displayed on the screen of the display unit 33, mixing of search targets searched for based on a search keyword can be reduced for display.

When search result information is generated so that a search result obtained by removing a portion of a second search result from a first search result is made to be displayed as at least a portion of the first search result, mixing of the first search result and the second search result is eliminated, which makes product related to the second search result more noticeable. In addition, the user is more likely to notice a search result based on a compound word.

[4. Operation of Second Embodiment of Information Processing System]

Next, the operation of a second embodiment of the information processing system will be described using figures. Incidentally, the same reference numerals are used for the same units as those in the first embodiment or corresponding units and only different configuration and operations will be described. This also applies to other embodiments and modifications.

(4.1 Operation Example of Generating Classification Dictionary by Information Processing Server)

First, as the operation of the second embodiment of an information processing system in the present invention, an operation example of generating a classification dictionary will be described using FIGS. 10 to 14.

FIGS. 10 to 14 are flowcharts showing operation examples of constructing each classification dictionary by the information processing server 10.

(4.1.1 Generation of a User Word Dictionary)

First, the generation of a user word dictionary will be described using FIG. 10.

Figure 10:
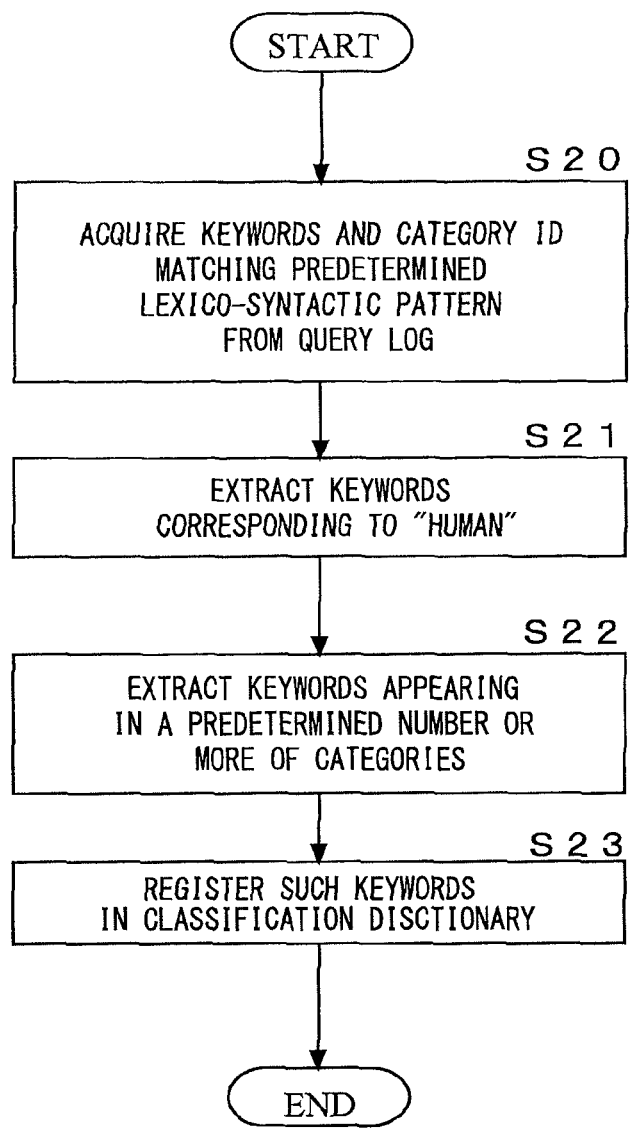
FIG. 10 is a flow chart showing an operation example of constructing a classification dictionary in the information processing server in FIG. 1.

As shown in FIG. 10, the information processing server 10 acquires a keyword matching a predetermined lexico-syntactic pattern and a category ID from a query log (step S20). More specifically, the system control unit 14 of the information processing server 10 acquires user related lexico-syntactic patterns "X YOU" (for X) and "X MUKE" (intended for X) by referring to the LSP-DB 12f. Then, the system control unit 14 acquires keywords matching these lexico-syntactic patterns and category IDs of the category to which the keywords belong by referring to the query log DB 12j.

Next, the information processing server 10 extracts keywords corresponding to "HITO" (human) (step S21). More specifically, the system control unit 14 of the information processing server 10 extracts a word corresponding to a word X of the lexico-syntactic pattern from the acquired keywords. Then, the system control unit 14 determines whether the word X expresses a human ("HITO" (human)) based on a dictionary in which expressions indicating a human are collected (the system control unit 14 determines, for example, whether a word in the dictionary and the word match). In the case of "DANSEI YOU" (for men), for example, the word X becomes "DANSEI" (men) and "DANSEI" (men) is registered in the dictionary and so is determined to be "HITO" (human). Thus, if the word X is determined to express "HITO" (human), the system control unit 14 extracts keywords corresponding to "HITO" (human) from keywords matching the lexico-syntactic pattern by adopting the original keyword containing the word X. Then, the system control unit 14 associates and stores the keyword corresponding to "HITO" (human) and the category ID in the storage unit 12.

Next, the information processing server 10 extracts keywords appearing in a predetermined number of categories or more (step S22). More specifically, the system control unit 14 of the information processing server 10 refers to the storage unit 12 to count an appearance number of some keyword appearing in categories based on the category ID. Then, the system control unit 14 extracts keywords whose appearance number is equal to a predetermined number or more.

Next, the information processing server 10 registers the keywords in the classification dictionary (step S23). More specifically, the system control unit 14 of the information processing server 10 registers, for example, extracted keywords like "SHINIA" (senior), "JUNIA" (junior), "BEBI" (baby), "User", and "DAISEI" (men) in the classification dictionary DB 12h.

(4.1.2 Generation of an Object Word Dictionary)

Next, the generation of an object word dictionary will be described using FIG. 11.

Figure 11:
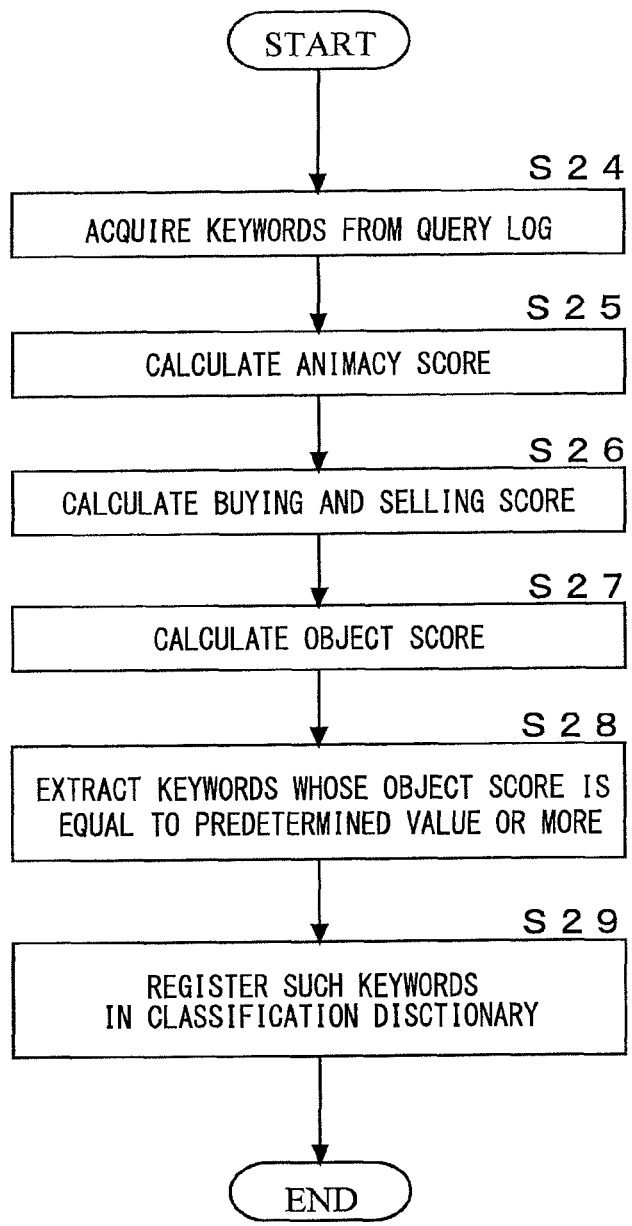
FIG. 11 is a flow chart showing the operation example of constructing the classification dictionary in the information processing server in FIG. 1.

As shown in FIG. 11, the information processing server 10 acquires a keyword from a query log (step S24). More specifically, the system control unit 14 of the information processing server 10 acquires keywords by referring to the query log DB 12j.

Next, the information processing server 10 calculates an animacy score (step S25). More specifically, the system control unit 14 of the information processing server 10 extracts a keyword X that appears as many times as a predetermined number or more in the query log DB 12j. Then, the system control unit 14 calculates an animacy score (Score#anim(X)) like Formula (1) by referring to a database related to dependency of the classification dictionary DB 12h.

$$Score\#anim(X) = \quad (1)$$
$$\#(X,"GA","IRU"(\text{be present}))/\{\#(X,"GA","IRU"(\text{be present})) +$$
$$\#(X,"GA","ARU"(\text{there is (are)}))\}$$

Here, #(X, a, b) is the frequency of "Xab" appearance in a database related to dependency of the classification dictionary DB 12h. For example, #(X, a, b) is a value indicating how often the phrase "X GA IRU" (X is present) appears in a database related to dependency.

Animacy is a kind of grammatical category and the property as a living being of a target indicated by a noun, pronoun or the like.

In Japanese, for a word of high animacy, for example, "X=KODOMO" (X=child), the frequency of appearance of "KODOMO GA IRU" (a child is present) is greater than that of "KODOMO GA ARU" (there is a child). For a word of low animacy, for example, "X=ISU" (X=chair), the frequency of appearance of "ISU GA ARU" (there is a chair) is greater than that of "ISU GA IRU" (a chair is present). Therefore, for a word of high animacy, the value of #(X, "GA", "IRU" (be present)) increases and also the value of Score#anim(X) increases.

In English, for a word of high animacy, for example, "X=man", the frequency of appearance of "the man's face" is greater than that of "the face of the man". For a word of low animacy, for example, "X=clock", the frequency of appearance of "the face of the clock" is greater than that of "the clock's face".

In English, the formula corresponding to Formula (1) is as follows:

$$Score\#anim(X) = \#(X,"'s",K)/\{\#(X,"'s",K) + \#(X,"of", K)\} \quad (2)$$

Here, K is a predetermined word like "face". Incidentally, a score about animacy may be calculated by making use of characteristics of each language.

Next, the information processing server 10 calculates a buy and sell score (step S26). More specifically, the system control unit 14 of the information processing server 10 calculates a buy and sell score (Score#sell&buy(X)) like Formula (3) for the keyword X that appears as many times as the predetermined number or more in the query log DB 12j by referring to a database related to dependency of the classification dictionary DB 12h.

$$Score\#sell\&buy(X) = \{\#(X,"WO","URU"(\text{sell})) + \#(X, "WO","KAU"(\text{buy}))\}/\#(X) \quad (3)$$

The value of the buy and sell score increases with an increasing frequency of appearance of a phrase related to buying and selling like "X WO KAU" (buy X) or "X WO URU" (sell X) in a database related to dependency.

In English, the system control unit 14 may calculate a buy and sell score according to Formula (4).

$$\text{Score\#sell\&buy}(X) = \{\#(\text{"sell"}, X) + \#(\text{"buy"}, X)\} / \#(X) \quad (4)$$

Incidentally, "purchase" may be used instead of "buy" or together. A score about buying and selling may be calculated by making use of characteristics of each language.

Next, the information processing server 10 calculates an object score (step S27). More specifically, the system control unit 14 of the information processing server 10 calculates an object score Score#obj (X) from an animacy score and a buy and sell score according to Formula (5).

$$\text{Score\#obj}(X) = (1 - \text{Score\#anim}(X)) \times \text{Score\#sell\&buy}(X) \quad (5)$$

As shown in Formula (5), the value of an object score increases with a decreasing animacy score and an increasing buy and sell score.

Next, the information processing server 10 extracts keywords whose object score is equal to a predetermined value or more (step S28). More specifically, the system control unit 14 of the information processing server 10 leaves, among acquired keywords, keywords whose object score is equal to a predetermined value or more.

Next, the information processing server 10 registers the keywords in the classification dictionary (step S29). More specifically, the system control unit 14 of the information processing server 10 registers extracted keywords, for example, "BIHAKU BIYOUEKI" (skin-whitening liquid foundation), "HEDDO DORESU" (headdress), and "IRO-GAMI" (colored paper) in the object word dictionary of the classification dictionary DB 12h.

With the processing in FIG. 11, an object word dictionary is generated.

(4.1.3 Generation of a Function Word Dictionary)

Next, the generation of a function word dictionary will be described using FIG. 12.

Figure 12:
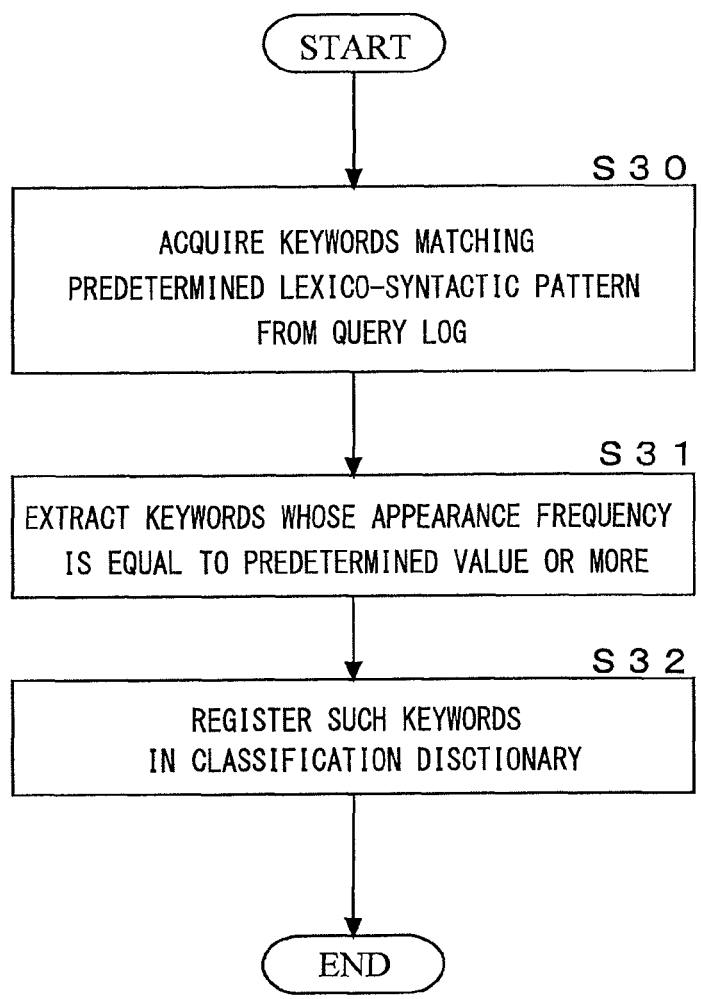
FIG. 12 is a flow chart showing the operation example of constructing the classification dictionary in the information processing server in FIG. 1.

As shown in FIG. 12, the information processing server 10 acquires keywords matching a predetermined lexico-syntactic pattern from a query log (step S30). More specifically, the system control unit 14 of the information processing server 10 acquires a function related lexico-syntactic pattern "X KINOU TSUKI" (with X function) by referring to the LSP-DB 12f. Then, the system control unit 14 acquires keywords matching the lexico-syntactic pattern by referring to the query log DB 12j.

Next, the information processing server 10 extracts keywords whose frequency of appearance is equal to a predetermined number or more (step S31). More specifically, the system control unit 14 of the information processing server 10 leaves keywords, among acquired keywords regarding "X KINOU TSUKI" (with X function), whose frequency of appearance in the product DB 12a is equal to a predetermined number or more.

Next, the information processing server 10 registers the keywords in the classification dictionary (step S32). More specifically, the system control unit 14 of the information processing server 10 registers extracted keywords, for example, "SHOUSHU" (deodorization), "TAISHIN" (earthquake-proof), and "SAIZU CHOUSEI" (size adjustment) in the function word dictionary of the classification dictionary DB 12h. In this manner, a function word dictionary is generated.

(4.1.4 Generation of a Shape Word Dictionary and a Material Word Dictionary)

Next, the generation of a shape word dictionary and a material word dictionary will be described using FIG. 13.

First, the generation of a shape word dictionary will be described.

Figure 13:
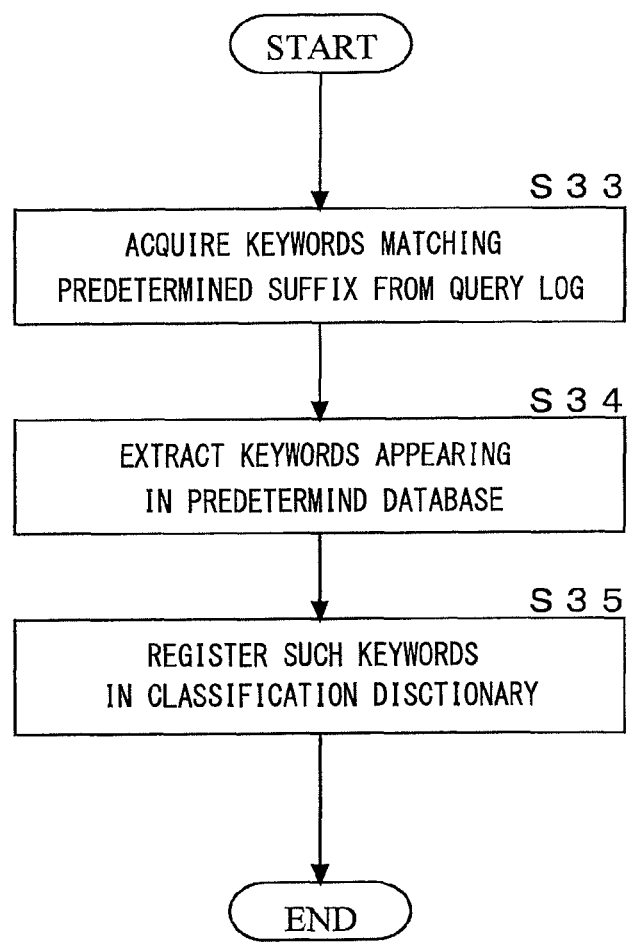
FIG. 13 is a flow chart showing the operation example of constructing the classification dictionary in the information processing server in FIG. 1.

As shown in FIG. 13, the information processing server 10 acquires keywords matching a predetermined suffix from a query log (step S33). More specifically, the system control unit 14 of the information processing server 10 acquires a suffix "KATA" (type) by referring to the suffix DB 12g. Then, the system control unit 14 acquires keywords matching "X KATA" (X type) by referring to the query log DB 12j.

Subsequently, the information processing server 10 extracts keywords appearing in a predetermined database (step S34). More specifically, the system control unit 14 of the information processing server 10 acquires lexico-syntactic patterns "X NOYOUNA KATACHI" (shape like X), "X NADONO KATACHI" (shape such as X), and "X NADONO KATACHI" (shape X or the like) by referring to the LSP-DB 12f. Then, the system control unit 14 transmits keywords fit for "X NOYOUNA KATACHI" (shape like X), "X NADONO KATACHI" (shape such as X), or "X NADONO KATACHI" (shape X or the like) obtained by applying the lexico-syntactic patterns to keywords matching the suffix pattern "X GATA" (X type) to the search server 5 as search keywords, and leaves keywords whose number of hits is equal to a predetermined number or more.

Then, the information processing server 10 registers the keywords in the classification dictionary (step S35). More specifically, the system control unit 14 of the information processing server 10 registers extracted keywords, for example, "MIKAZUKI" (crescent) and "DAEN" (ellipse) in the shape word dictionary of the classification dictionary DB 12h. In this manner, a shape word dictionary is generated.

Next, the generation of a material word dictionary will be described similarly using FIG. 13.

First, the information processing server 10 acquires keywords matching a predetermined suffix from a query log (step S33). More specifically, the system control unit 14 of the information processing server 10 acquires a suffix "SEI" (made of) by referring to the suffix DB 12g. Then, the system control unit 14 acquires keywords matching "X SEI" (made of X) by referring to the query log DB 12j. The system control unit 14 of the information processing server 10 also acquires lexico-syntactic patterns "X NOYOUNA SOZAI" (material like X), "X NADONO SOZAI" (material such as X), and "X NADONO SOZAI" (material X or the like) by referring to the LSP-DB 12f. Then, the system control unit 14 transmits keywords obtained by applying the lexico-syntactic patterns to keywords matching the suffix pattern "X SEI" (made of X) to suit "X NOYOUNA SOZAI" (material like X), "X NADONO SOZAI" (material such as X), or "X NADONO SOZAI" (material X or the like) to the search server 5 as search keywords to leave keywords whose number of hits is equal to a predetermined number or more.

Next, the information processing server 10 registers the keywords in the classification dictionary (step S35). More specifically, the system control unit 14 registers extracted keywords such as "KAWA" (leather), "GOMU" (rubber), and "GARASU" (glass) in the material word dictionary of the classification dictionary DB 12h. In this manner, a material word dictionary is generated.

Incidentally, instead of the search in the search server 5, the search in the product DB 12a may be used.

(4.1.5 Generation of a Location Word Dictionary and a Company Name Word Dictionary)

Next, the generation of a location word dictionary and a company name word dictionary will be described using FIG. 14.

Figure 14:
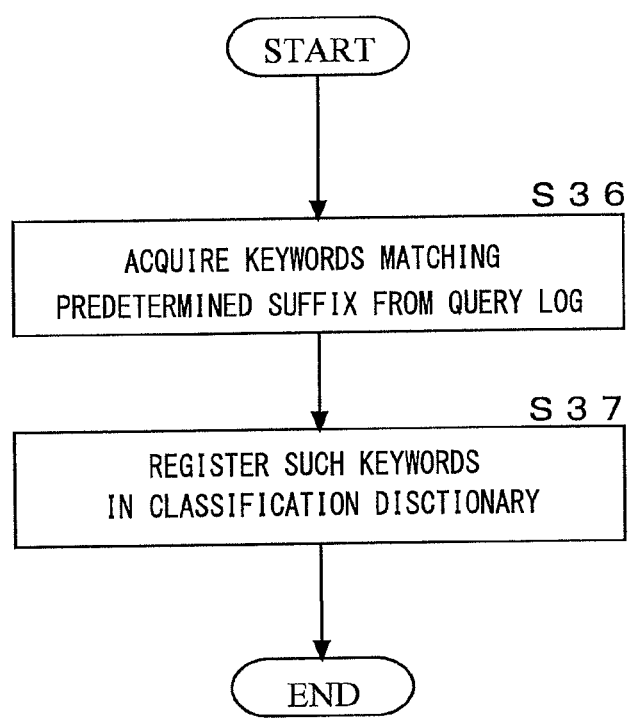
FIG. 14 is a flow chart showing the operation example of constructing the classification dictionary in the information processing server in FIG. 1.

As shown in FIG. 14, the information processing server 10 acquires keywords matching a predetermined suffix from a query log (step S36). More specifically, the system control unit 14 of the information processing server 10 acquires a suffix "SAN" (produced in) for a location name dictionary and suffixes "SHA" (company) and "SEI" (made by) for a company name word by referring to the suffix DB 12*g*. Then, for a location word dictionary, the system control unit 14 acquires keywords matching "X SAN" (produced in X) by referring to the query log DB 12*j*. For a company name word dictionary, the system control unit 14 acquires keywords matching "X SHA" (X company) by referring to the query log DB 12*j*.

Incidentally, for a company name word dictionary, the system control unit 14 may acquire keywords matching "X SEI" (made by X) and further leave keywords matching "BURANDO NO X" (X of brand), "BURANDO X" (brand X), "MEKA NO X" (X of maker), or "MEKA X" (maker X). Alternatively, the system control unit 14 may acquire keywords matching "X SEI" (made by X) and leave keywords whose number of hits is equal to a predetermined number or more after conducting a search using "BURANDO NO X" (X of brand), "BURANDO X" (brand X), "MEKA NO X" (X of maker), and "MEKA X" (maker X) as search keywords.

Next, the information processing server 10 registers the keywords in the classification dictionary (step S37). More specifically, for a location word dictionary, the system control unit 14 of the information processing server 10 registers extracted keywords, for example, "TOKYO" (Tokyo), "HIROSHIMA" (Hiroshima), and "ITARIA" (Italy) in the location word dictionary of the classification dictionary DB 12*h*. For a company name word dictionary, the system control unit 14 registers keywords of extracted companies, brand names, and product names in the company name word dictionary of the classification dictionary DB 12*h*. In this manner, a company name word dictionary is generated. Incidentally, though called the "company name word dictionary" in the present embodiment, company name words including brand names and the like are generically called company name words.

As described above, the information processing server 10 functions as an example of a classification dictionary generation means that generates a classification dictionary by deciding the association of a classification item and a predetermined word in accordance with the appearance number of the predetermined word appearing in a predetermined database, or by deciding association of each of the classification items and the predetermined word by extracting the predetermined word suited to an extraction pattern corresponding to the classification item from the predetermined database.

(4.2 Operation Example of Search Result Classification in Information Processing System)

Next, an operation example according to the second embodiment of search result classification in an information processing system will be described using FIG. 15.

Figure 15:
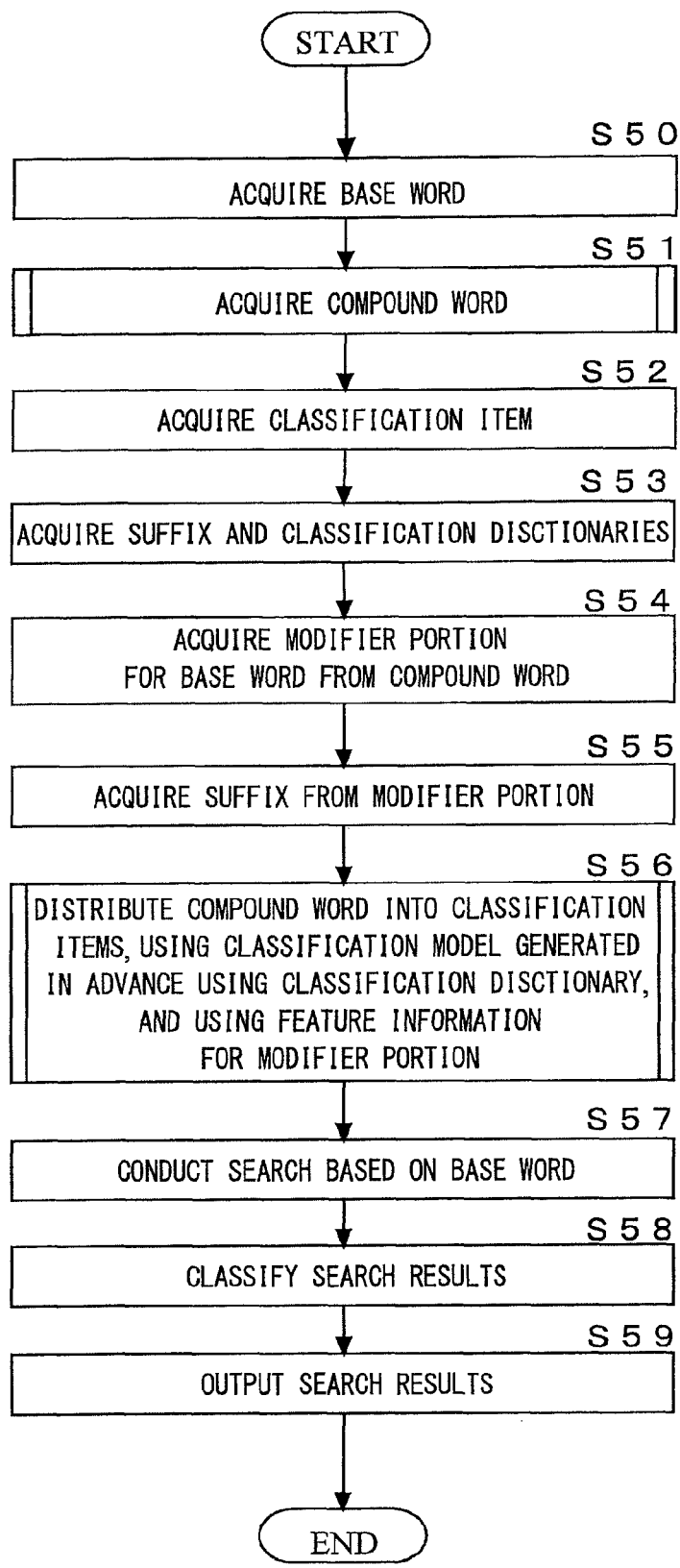
FIG. 15 is a flow chart showing an operation example according to a second embodiment of the information processing server in FIG. 1.

FIG. 15 is a flow chart showing an operation example of the second embodiment of the information processing server 10.

The information processing server 10 acquires, like in step S10, a base word (step S50).

Next, the information processing server 10 acquires a compound word (step S51). More specifically, the system control unit 14 of the information processing server 10 acquires a compound word by acquiring the compound word from the storage unit 12 or the RAM 14*c* according to a subroutine to acquire a compound word from the acquired base word. Incidentally, the acquisition of a compound word will be described in detail in the subroutine to acquire a compound word. The information processing server 10 may acquire, like in step S11, a compound word related to the acquired base word by referring to the compound word DB 12*d*.

Thus, the information processing server 10 functions as an example of the compound word acquisition means that acquires a compound word decided by a compound word decision means. The information processing server 10 also functions as an example of the compound word acquisition means that acquires a compound word in which a base word acquired by the base word acquisition means becomes a modifiee.

Next, the information processing server 10 acquires, like in step S12, classification items (step S52).

Next, the information processing server 10 acquires information on the suffix and classification dictionary (step S53). More specifically, the system control unit 14 of the information processing server 10 acquires information on the suffix and classification dictionary about how to use feature information such as the suffix and classification dictionary in a classification model generated in advance using the classification dictionary by referring to the feature information DB 102. Incidentally, the classification model generated in advance using the classification dictionary will be described in detail in a subroutine to distribute a compound word.

Thus, the information processing server 10 functions as an example of the feature information acquisition means that acquires feature information about a feature that provides a clue to classify a compound word acquired by the compound word acquisition means by referring to the feature information storage means. The information processing server 10 also functions as an example of the feature information acquisition means that acquires a classification dictionary that associates each of the classification items with predetermined words by referring to the feature information storage means.

Next, the information processing server 10 acquires a modifier portion with respect to the base word from the compound word (step S54). More specifically, when the base word is "HERUMETTO" (helmet) and the compound word is "KODOMO YOU HERUMETTO" (helmet for children), the system control unit 14 of the information processing server 10 acquires the modifier portion "KODOMO YOU" (for children).

Thus, the information processing server 10 functions as an example of a modifier portion acquisition means that acquires a modifier portion with respect to a base word of a compound word.

Next, the information processing server 10 acquires a suffix from the modifier portion (step S55). More specifically, when the modifier portion is "KODOMO YOU" (for children), the system control unit 14 of the information processing server 10 acquires a suffix "YOU" (for).

Thus, the information processing server 10 functions as an example of a suffix acquisition means that acquires a suffix from a modifier portion acquired by the modifier portion acquisition means.

Next, the information processing server 10 distributes the compound word into a classification item using the classification model generated in advance using the classification dictionary and feature information for the modifier portion (step S56). For example, compound words like "KODOMO YOU HERUMETTO" (helmet for children) and "OTONA YOU HERUMETTO" (helmet for adults) are distributed into, as in step S15, the classification item "User". Incidentally, distributing of a compound word will be described in detail in a subroutine to distribute a compound word.

The information processing server 10 also functions as an example of the compound word classification means that distributes a compound word containing a base word into a classification item acquired by the classification item acquisition means using a classification model generated in advance and feature information acquired by the feature information acquisition means for the compound word acquired by the compound word acquisition means. The information processing server 10 also functions as an example of the compound word classification means that distributes a compound word containing a base word into a classification item using a classification model generated in advance using the classification dictionary stored in the feature information storage means and feature information for a modifier portion acquired by the modifier portion acquisition means.

Next, like in step S16, the information processing server 10 conducts a search based on the base word (step S57).

Next, like in step S17, the information processing server 10 classifies a search result (step S58).

Next, like in step S18, the information processing server 10 outputs the search result (step S59).

(4.3 Subroutine to Acquire Compound Word)

Next, the subroutine to acquire a compound word will be described using FIG. 16.

Figure 16:
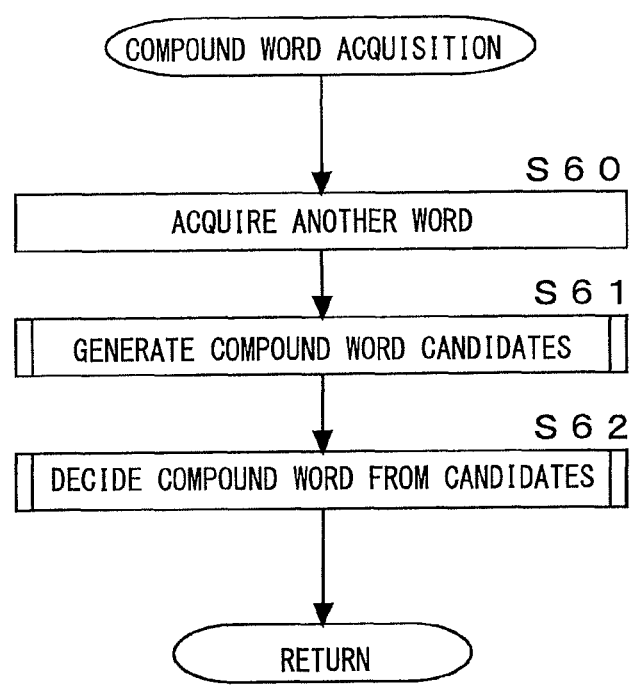
FIG. 16 is a flow chart showing a subroutine to acquire a compound word in FIG. 15.

FIG. 16 is a flow chart showing a subroutine to acquire a compound word.

Next, the information processing server 10 acquires another word (step S60). More specifically, the system control unit 14 of the information processing server 10 acquires other words used together with the base word by referring to the query log DB 12*j*. When the base word is "HERUMETTO" (helmet), the system control unit 14 of the information processing server 10 acquires "KODOMO" (child), "JITENSHA" (bicycle), "BOUSAI" (disaster prevention) or the like as other words by referring to the query log DB 12*j*.

Next, the information processing server 10 generates compound word candidates (step S61). More specifically, the system control unit 14 of the information processing server 10 generates compound word candidates related to the base word by combining the base word and other words through the subroutine to generate compound word candidates. The generated compound word candidates are stored in the storage unit 12 or the RAM 14*c*. Here, as compound word examples, compound word candidates combining the base word and other words like "KODOMO YOU HERUMETTO" (helmet for children), "JITENSHA YOU HERUMETTO" (helmet for bicycle), and "JITENSHA TSUKI HERUMETTO" (helmet with bicycle). Incidentally, the generation of compound word candidates will be described in detail in a subroutine to generate compound word candidates.

Next, the information processing server 10 decides compound words from the candidates (step S62). More specifically, the system control unit 14 of the information processing server 10 calculates a score for each compound word candidate from generated compound word candidates to decide compound words having a score equal to a predetermined value or more. If the scores of "KODOMO YOU HERUMETTO" (helmet for children) and "JITENSHA YOU HERUMETTO" (helmet for bicycle) are larger than the predetermined value and the score of "JITENSHA TSUKI HERUMETTO" (helmet with bicycle) is smaller than the predetermined value, "KODOMO YOU HERUMETTO" (helmet for children), "JITENSHA YOU HERUMETTO" (helmet for bicycle) are decided as compound words. Then, the system control unit 14 temporarily stores the decided compound words in the storage unit 12 or the RAM 14*c* as examples of the storage means. Incidentally, the decision of a compound word will be described in detail in a subroutine to decide a compound word.

When the subroutine terminates, the information processing server 10 performs processing in step S52.

(4.4 Subroutine to Generate Compound Word Candidate)

Next, the subroutine to generate a compound word candidate will be described using FIG. 17.

Figure 17:
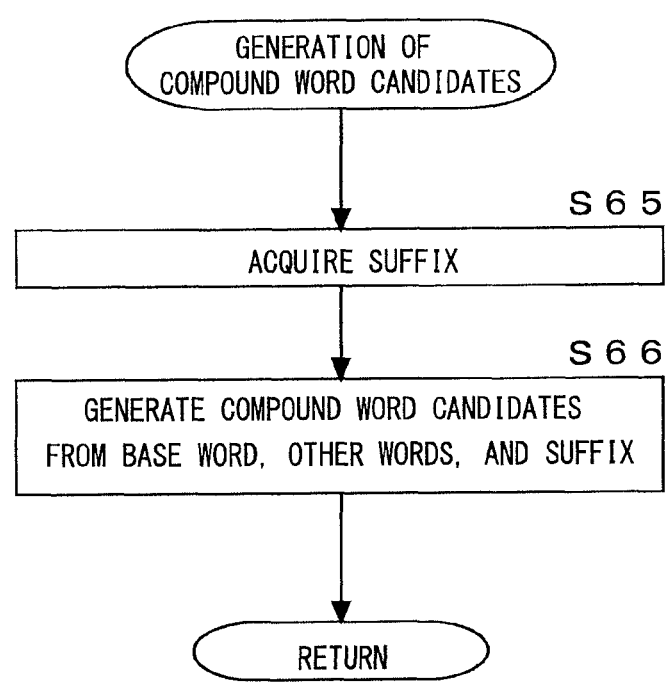
FIG. 17 is a flow chart showing a subroutine to generate a compound word candidate in FIG. 16.

FIG. 17 is a flow chart showing a subroutine to generate candidates of a compound word.

As shown in FIG. 17, the information processing server 10 acquires suffixes (step S65). More specifically, the system control unit 14 of the information processing server 10 reads out "YOU" (for), "TSUKI" (with), "SEI" (made of), "SAN" (produced in), "KATA" (type), "BAN" (board), "BAN" (version), "GARA" (pattern), and "IRO" (color) as suffix characters (examples of the intermediate character) by referring to the suffix DB 12*g*.

Next, the information processing server 10 generates compound word candidates from the base word, other words, and suffixes (step S66). More specifically, the system control unit 14 of the information processing server 10 generates compound word candidates combining a read suffix character, the base word, and another word by referring to the suffix DB 12*g*. Such a suffix character is placed between the base word and another word to generate a compound word candidate. When, for example, the base word is "HERUMETTO" (helmet) and another word is "JITENSHA" (bicycle), "JITENSHA YOU HERUMETTO" (helmet for bicycle), "JITENSHA TSUKI HERUMETTO" (helmet with bicycle), "JITENSHA SEI HERUMETTO" (helmet made of bicycle), . . . , "HERUMETTO YOU JITENSHA" (bicycle for helmet), . . . , "HERUMETTO SEI JITENSHA" (bicycle made of helmet) and the like are generated as compound word examples. At this point, compound word candidates also in the order of the base word, a suffix, and another word like "HERUMETTO YOU JITENSHA" (bicycle for helmet) are generated. "HERUMETTO YOU RAITO" (light for helmet), "RAITO TSUKI HERUMETTO" (helmet with light), . . . , "KODOMO YOU HERUMETTO" (helmet for children) and the like when another word is other than "JITENSHA" (bicycle) are generated When the subroutine terminates, the information processing server 10 performs processing in step S62. Thus, the information processing server 10 functions as an example of a compound word candidate generation means that generates a compound word candidate from a base word. The information processing server 10 also functions as an example of the compound word candidate generation means that generates a candidate by combining a base word and another word. The information processing server 10 also functions as an example of the compound word candidate generation means that generates a candidate by combining a base word and a word other than the base word. The information processing server 10 also functions as an example of the compound word candidate generation means that generates a candidate by an intermediate character placed between a base word and another word.

(4.5 Subroutine to Decide Compound Word)

Next, the subroutine to decide a compound word will be described using FIG. 18.

Figure 18:
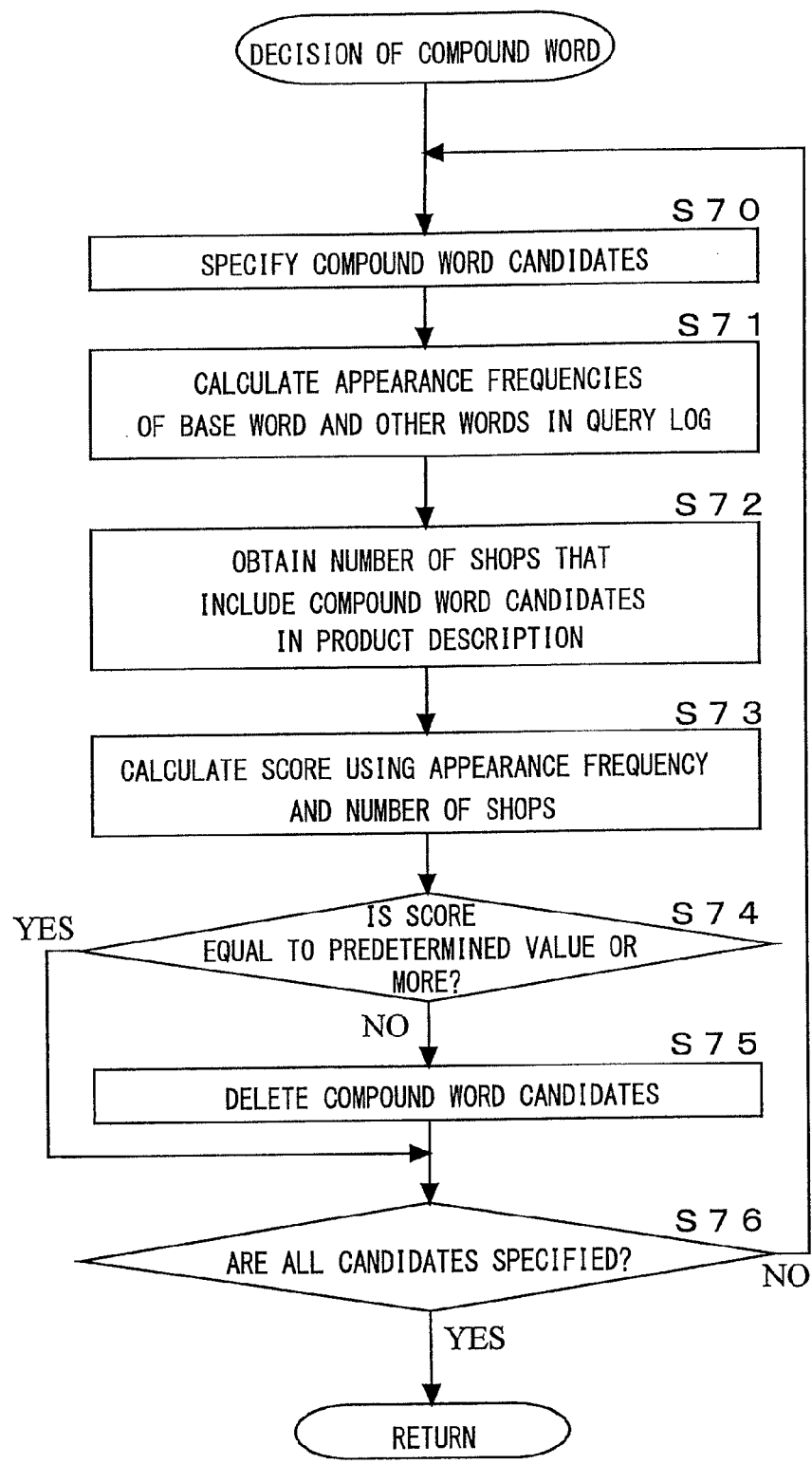
FIG. 18 is a flow chart showing a subroutine to decide a compound word in FIG. 16.

FIG. 18 is a flow chart showing a subroutine to decide a compound word.

As shown in FIG. 18, the information processing server 10 specifies a compound word candidate (step S70). More specifically, the system control unit 14 of the information processing server 10 specifies one compound word candidate (for example, "JITEMSHA YOU HERUMETTO" (helmet for bicycle)) in order from among compound word candidates generated in step S61 and stored in the storage unit 12 or the RAM 14c.

Next, the information processing server 10 calculates a frequency of appearance of the base word and another word in the query log (step S71). More specifically, the system control unit 14 of the information processing server 10 calculates a frequency of appearance $N_{k1,k2}$ in which both of the base word and another word appear together by referring to the query log DB 12j. Here, k1 represents the base word and k2 represents another word. When, for example, as shown in FIG. 4, the base word is "HERUMETTO" (helmet) and another word is "JITENSHA" (bicycle), the system control unit 14 of the information processing server 10 reads as many pieces of data of the base word "HERUMETTO" (helmet) and the other word "JITENSHA" (bicycle) as there are from the query log DB 12j and sets the number thereof as the frequency of appearance $N_{k1,k2}$.

Next, the information processing server 10 obtains the number of shops that include compound word candidates in their product description (step S72). More specifically, the system control unit 14 of the information processing server 10 obtains the product ID by specifying product of an specified compound word candidate (for example, "JITENSHA YOU HERUMETTO" (helmet or bicycle)) or product used by a compound word candidate in the product description by referring to the product DB 12a. Then, the system control unit 14 of the information processing server 10 calculates the number of shops dealing in product $M_{k1,s,k2}$ by counting shops that deal in product of a compound word candidate or use a compound word candidate in their product description based on the product ID by referring to the shop DB 12b. Here, s represents the suffix such as "YOU" (for), "TSUKI" (with), "SET" (made of), "SAN" (produced in), "KATA" (type), "BAN" (board), "BAN" (version), "GARA" (pattern), and "IRO" (color), the preposition such as "for", "with", and "in", a functional expression such as "for the purpose of".

Next, the information processing server 10 calculates a score using the frequency of appearance and the number of shops (step S73). More specifically, the system control unit 14 of the information processing server 10 calculates, using the frequency of appearance $N_{k1,k2}$ and the number of shops $M_{k1,s,k2}$ a score Score(k1,s,k2) as a function of the base word, suffix, and another word according to $$\text{Score}(k1,s,k2) = \log(N_{k1,k2}) \times \log(M_{k1,s,k2}) \quad (6)$$

Next, the information processing server 10 determines whether the score is equal to a predetermined value or more (step S74). More specifically, the system control unit 14 of the information processing server 10 determines whether the calculated score Score is equal to a predetermined value or more. Here, the score Score(k1,s,k2) indicates a large value when the base word k1 and the other word k2 are words frequently used by the user who searches for product and the compound word (k1,s,k2) is a word frequently used by each shop. log $(N_{k1,k2})$ indicates a state on the demand side of product and log$(M_{k1,s,k2})$ indicates a state on the supply side of product.

Next, if the score is not equal to a predetermined value or more (step S74; NO), the information processing server 10 deletes the compound word candidate (step S75). More specifically, if the score Score(k1,s,k2) is less than a predetermined value, the system control unit 14 of the information processing server 10 regards the compound word candidate as inappropriate as a compound word and deletes the word from the storage unit 12 or the RAM 14c.

If the score is equal to a predetermined value or more (step S74; YES), the information processing server 10 proceeds to the processing in step S76 without deleting the specified compound word candidate.

Thus, the information processing server 10 functions as an example of the compound word decision means that decides a compound word. The information processing server 10 also functions as an example of the compound word decision means that decides a compound word in accordance with the number of shops after obtaining the number of shops that deal in the product by including a compound word candidate generated by the compound word candidate generation means in their product description. The information processing server 10 also functions as an example of the compound word decision means that decides a compound word in accordance with the appearance number in which a base word appears in a predetermined database. The information processing server 10 also functions as an example of the compound word decision means that decides a compound word in accordance with the number of hits of a search using a compound word candidate generated by the compound word candidate generation means as the search keyword.

Next, the information processing server 10 determines whether all candidates have been specified (step S76). More specifically, the system control unit 14 of the information processing server 10 determined whether all compound word candidates stored in the storage unit 12 or the RAM 14c have been specified. If all candidates have not yet been specified (step S76; NO), the information processing server 10 moves to the processing in step S70.

If all candidates have been specified (step S76; YES), the processing of the subroutine terminates and the information processing server 10 performs the processing in step S52.

(4.6 Subroutine to Distribute Compound Word)

Next, the subroutine to distribute a compound word will be described using FIG. 19.

Figure 19:
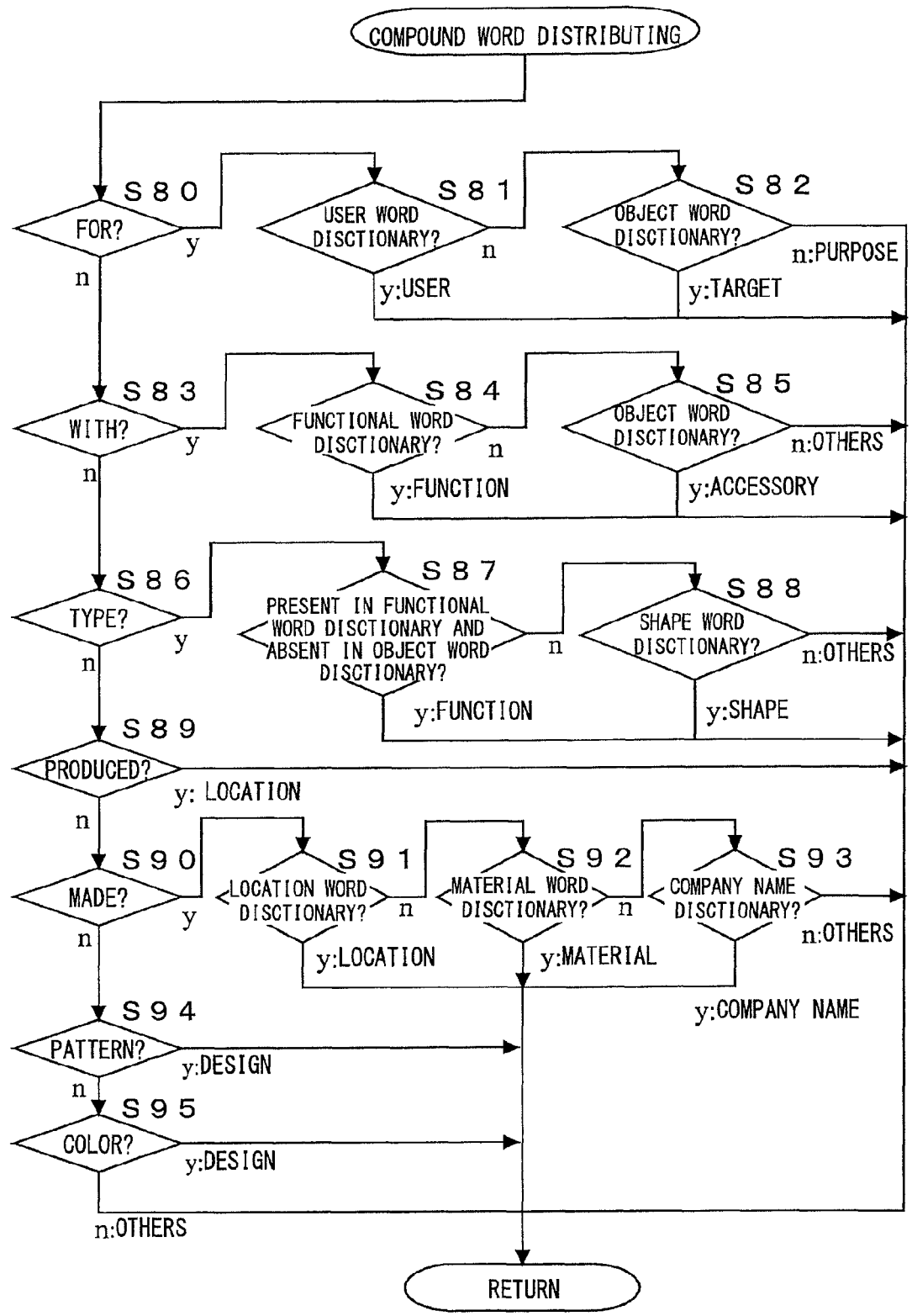
FIG. 19 is a flow chart showing a subroutine to distribute a compound word in FIG. 15.

FIG. 19 is a flow chart showing a subroutine to distribute a compound word.

Incidentally, the subroutine to distribute a compound word uses rules (heuristic rules) obtained heuristically. The rules are an example of a classification model generated in advance using the classification dictionary and a rule-based classification model generated in advance.

As shown in FIG. 19, the information processing server 10 determines whether the suffix is "YOU" (for) (step S80). More specifically, the system control unit 14 of the information processing server 10 determines whether the suffix (an example of the acquired modifier portion) acquired in step S55 as an example using feature information for the acquired modifier portion corresponds to the suffix "YOU" (for) (an example of feature information). If, for example, the base word is "HERUMETTO" (helmet) and the compound word is "KODOMO YOU HERUMETTO" (helmet for children) or "JITENSHA YOU HERUMETTO" (helmet for bicycle), the suffix is "YOU" (for) and thus, the suffix corresponds to the suffix "YOU" (for). If the base word is "HERUMETTO" (helmet) and the compound word is "RAITO TSUKI HERUMETTO" (helmet with light), the suffix is "TSUKI" (with) and thus, the suffix does not correspond to the suffix "YOU" (for).

If the suffix is "YOU" (for) (step S80; YES), the information processing server 10 determines whether the word of the modifier portion excluding the suffix is present in the user word dictionary (step S81). More specifically, the system control unit 14 of the information processing server 10 determines whether the word of the modifier portion excluding the suffix as an example using feature information for the acquired modifier portion is present in the dictionary by referring to the user word dictionary (an example of feature information) of the classification dictionary DB 12*h*.

If the word of the modifier portion excluding the suffix is present in the user word dictionary (step S81; YES), the information processing server 10 distributes the compound word to be distributed into the classification item "User". If, for example, the modifier portion excluding the suffix is "KODOMO" (child), the word is present in the user word dictionary and thus, the compound word "KODOMO YOU HERUMETTO" (helmet for children) is distributed into the classification item "User".

If the word of the modifier portion excluding the suffix is not present in the user word dictionary (step S81; NO), the information processing server 10 determines whether the word of the modifier portion excluding the suffix is present in the object word dictionary (step S82). More specifically, the system control unit 14 of the information processing server 10 determines whether the word of the modifier portion excluding the suffix as an example using feature information for the acquired modifier portion is present in the dictionary by referring to the object word dictionary (an example of feature information) of the classification dictionary DB 12*h*.

If the word of the modifier portion excluding the suffix is present in the object word dictionary (step S82; YES), the information processing server 10 distributes the compound word into the classification item "Target". If, for example, the modifier portion excluding the suffix is "JITENSHA" (bicycle), the word is present in the object word dictionary and thus, the compound word "JITENSHA YOU HERUMETTO" (helmet for bicycle) is distributed into the classification item "Target".

If the word of the modifier portion excluding the suffix is not present in the object word dictionary (step S82; NO), the information processing server 10 distributes the compound word into the classification item "Purpose". For the compound word "BOUSAI YOU HERUMETTO" (helmet for disaster prevention), "BOUSAI" (disaster prevention) is not present in the object word dictionary and thus, the compound word "BOUSAI YOU HERUMETTO" (helmet for disaster prevention) is distributed into the classification item "Purpose".

If the suffix is not "YOU" (for) (step S80; NO), the information processing server 10 determines whether the suffix is "TSUKI" (with) (step S83). More specifically, the system control unit 14 of the information processing server 10 determines whether the suffix acquired in step S55 as an example using feature information for the acquired modifier portion corresponds to the suffix "TSUKI" (with) (an example of feature information).

If the suffix is "TSUKI" (with) (step S83; YES), the information processing server 10 determines whether the word of the modifier portion excluding the suffix is present in the function word dictionary (step S84). More specifically, the system control unit 14 of the information processing server 10 determines whether the word of the modifier portion excluding the suffix as an example using feature information for the acquired modifier portion is present in the dictionary by referring to the function word dictionary (an example of feature information) of the classification dictionary DB 12*h*.

If the word of the modifier portion excluding the suffix is present in the function word dictionary (step S84; YES), the information processing server 10 distributes the compound word to be distributed into the classification item "Function".

If the word of the modifier portion excluding the suffix is not present in the function word dictionary (step S84; NO), the information processing server 10 determines whether the word of the modifier portion excluding the suffix is present in the object word dictionary (step S85). More specifically, the system control unit 14 of the information processing server 10 determines whether the word of the modifier portion excluding the suffix as an example using feature information for the acquired modifier portion is present in the dictionary by referring to the object word dictionary (an example of feature information) of the classification dictionary DB 12*h*.

If the word of the modifier portion excluding the suffix is present in the object word dictionary (step S85; YES), the information processing server 10 distributes the compound word into the classification item "Accessory".

If the word of the modifier portion excluding the suffix is not present in the object word dictionary (step S85; NO), the information processing server 10 distributes the compound word into the classification item "Others".

If the suffix is not "TSUKI" (with) (step S83; NO), the information processing server 10 determines whether the suffix is "KATA" (type) (step S86). More specifically, the system control unit 14 of the information processing server 10 determines whether the suffix acquired in step S55 as an example using feature information for the acquired modifier portion corresponds to the suffix "KATA" (type) (an example of feature information).

If the suffix is "KATA" (type) (step S86; YES), the information processing server 10 determines whether the word of the modifier portion excluding the suffix as an example using feature information for the acquired modifier portion is present in the function word dictionary and is not present in the object word dictionary (step S87). More specifically, the system control unit 14 of the information processing server 10 determines whether the word of the modifier portion excluding the suffix is registered by referring to the function word dictionary of the classification dictionary DB 12*h* and further, the word of the modifier portion excluding the suffix is not registered by referring to the object word dictionary. That is, "NO" is determined when the word of the modifier portion excluding the suffix is not registered in the function word dictionary. In addition, even if the word of the modifier portion excluding the suffix is registered in the function word dictionary, if the word is registered on the object word dictionary, "NO" is determined.

If the word of the modifier portion excluding the suffix is present in the function word dictionary and is not present in the object word dictionary (step S87; YES), the information processing server 10 distributes the compound word into the classification item "Function".

If the word of the modifier portion excluding the suffix is not present in the function word dictionary or is present in the object word dictionary (step S87; NO), the processing proceeds to step S88 and the information processing server 10 determines whether the word of the modifier portion excluding the suffix as an example using feature information for the acquired modifier portion is "Shape" by referring to the shape word dictionary of the classification dictionary DB 12*h* (step S88). If, in this case, the word of the modifier portion excluding the suffix is present in the shape word dictionary (step S88; YES), the information processing server 10 determines that the word is "Shape" and distributes the compound word into the classification item "Shape". On the other hand, if the word of the modifier portion excluding the suffix is not present in the shape word dictionary (step S88; NO), the information processing server 10 distributes the compound word into the classification item "Others".

Incidentally, if the suffix is "KATA" (type) and a word corresponding to the classification item "Others" is not in the word of the modifier portion excluding the suffix, step S88 may be omitted without using the shape word dictionary. In this case, if the word of the modifier portion excluding the suffix is not present in the function word dictionary or is present in the object word dictionary (step S87; NO), the information processing server 10 distributes the compound word into the classification item "Shape".

If the suffix is not "KATA" (type) (step S86; NO), the information processing server 10 determines whether the suffix is "SAN" (produced in) (step S89). More specifically, the system control unit 14 of the information processing server 10 determines whether the suffix acquired in step S55 as an example using feature information for the acquired modifier portion corresponds to the suffix "SAN" (produced in) (an example of feature information).

If the suffix is "SAN" (produced in) (step S89; YES), the information processing server 10 distributes the compound word into the classification item "Location".

If the suffix is not "SAN" (produced in) (step S89; NO), the information processing server 10 determines whether the suffix is "SEI" (made) (step S90). More specifically, the system control unit 14 of the information processing server 10 determines whether the suffix acquired in step S55 as an example using feature information for the acquired modifier portion corresponds to the suffix "SEI" (made) (an example of feature information).

If the suffix is "SEI" (made) (step S90; YES), the information processing server 10 determines whether the word of the modifier portion excluding the suffix is present in the location word dictionary (step S91). More specifically, the system control unit 14 of the information processing server 10 determines whether the word of the modifier portion excluding the suffix as an example using feature information for the acquired modifier portion is present in the dictionary by referring to the location word dictionary (an example of feature information) of the classification dictionary DB 12h.

If the word of the modifier portion excluding the suffix is present in the location word dictionary (step S91; YES), the information processing server 10 distributes the compound word to be distributed into the classification item "Location". If, for example, the compound word is "NIHON SEI HERUMETTO" (helmet made in Japan), the compound word is distributed into the classification item "Location".

If the word of the modifier portion excluding the suffix is not present in the location word dictionary (step S91; NO), the information processing server 10 determines whether the word of the modifier portion excluding the suffix is present in the material word dictionary (step S92). More specifically, the system control unit 14 of the information processing server 10 determines whether the word of the modifier portion excluding the suffix as an example using feature information for the acquired modifier portion is present in the dictionary by referring to the material word dictionary (an example of feature information) of the classification dictionary DB 12h.

If the word of the modifier portion excluding the suffix is present in the material word dictionary (step S92; YES), the information processing server 10 distributes the compound word into the classification item "Material". If, for example, the compound word is "KINZOKU SEI HERUMETTO" (helmet made of metal), the compound word is distributed into the classification item "Material".

If the word of the modifier portion excluding the suffix is not present in the material word dictionary (step S92; NO), the information processing server 10 determines whether the word of the modifier portion excluding the suffix is present in the company name word dictionary (step S93). More specifically, the system control unit 14 of the information processing server 10 determines whether the word of the modifier portion excluding the suffix as an example using feature information for the acquired modifier portion is present in the dictionary by referring to the company name word dictionary (an example of feature information) of the classification dictionary DB 12h.

If the word of the modifier portion excluding the suffix is present in the company name word dictionary (step S93; YES), the information processing server 10 distributes the compound word into the classification item "Company Name". If, for example, the compound word is "○○SHA SEI HERUMETTO" (helmet made by ○○ company), the compound word is distributed into the classification item "Company Name".

If the word of the modifier portion excluding the suffix is not present in the company name word dictionary (step S93; NO), the information processing server 10 distributes the compound word into the classification item "Others".

If the suffix is not "SEI" (made) (step S90; NO), the information processing server 10 determines whether the suffix is "GARA" (pattern) (step S94). More specifically, the system control unit 14 of the information processing server 10 determines whether the suffix acquired in step S55 as an example using feature information for the acquired modifier portion corresponds to the suffix "GARA" (pattern) (an example of feature information).

If the suffix is "GARA" (pattern) (step S94; YES), the information processing server 10 distributes the compound word into the classification item "Design". If, for example, the compound word is "MEISAI GARA HERUMETTO" (camouflage pattern helmet), the compound word is distributed into the classification item "Design".

If the suffix is not "GARA" (pattern) (step S94; NO), the information processing server 10 determines whether the suffix is "IRO" (color) (step S95). More specifically, the system control unit 14 of the information processing server 10 determines whether the suffix acquired in step S55 as an example using feature information for the acquired modifier portion corresponds to the suffix "IRO" (color) (an example of feature information).

If the suffix is "IRO" (color) (step S95; YES), the information processing server 10 distributes the compound word into the classification item "Design". If, for example, the compound word is "SHIRO IRO HERUMETTO" (white helmet), the compound word is distributed into the classification item "Design".

If the suffix is not "IRO" (color) (step S95; NO), the information processing server 10 distributes the compound word into the classification item "Others".

When the processing of distributing the compound word terminates, the information processing server 10 performs the processing in step S57. Thus, the information processing server 10 functions as an example of the compound word classification means that distributes a compound word containing a base word into a classification item using a classification model generated in advance using the classification dictionary and feature information for the acquired modifier portion.

Incidentally, rules for combining the suffix and classification dictionary are not limited to FIG. 19 and other combinations or rules may also be used. In addition, the order of steps S80, S83, S86, S89, S90, S94, S95 may be interchanged. However, the orders of steps S80 to S82, steps S83 to S85, steps 86 to S88, and steps 90 to 93 are not changed.

According to the present embodiment described above, a base word to be a base, a compound word in which the base word becomes a modifiee, classification items to classify the compound word, and feature information (for example, information about the suffix and classification dictionary) about a feature that provides a clue to classify the compound word are acquired, the compound word containing the base word is distributed into the acquired classification item using a classification model (for example, rules as shown in FIG. 19) generated in advance and the acquired feature information (for example, the compound word is distributed into a classification item using, for example, rules as shown in FIG. 19 for the compound word), base word related information based on the base word and containing a plurality of elements related to the base word is acquired (for example, a search result based on a search keyword is acquired), each of at least a portion of elements contained in the base word related information is classified into one of the classification items in accordance with a result of the classification, and the classified base word related information is output to classify the base word related information according to classification item and therefore, mixing of the base word related information is distributed out based on the classification item so that a display that is easy for the user to view can be provided.

When a classification dictionary associating each classification item and a predetermined word is stored, a modifier portion with respect to a base word of a compound word is acquired, the classification dictionary associating the classification items and predetermined words is acquired by referring to the feature information database 102, and the compound word containing the base word is distributed into a classification item using a classification model generated in advance using the classification dictionary stored in the feature information database 102 and feature information about the acquired modifier portion, the compound word can efficiently be distributed into the classification item according to the classification dictionary.

When a suffix is acquired from an acquired modifier portion and a compound word containing a base word is distributed into a classification item using a classification model generated in advance using a classification dictionary stored in the feature information database 102 and feature information for the modifier portion excluding the suffix, the compound word can efficiently be distributed into the classification item according to predetermined rules.

When a classification dictionary is generated by deciding the association of each classification item and a predetermined word in accordance with the appearance number of the predetermined word appearing in a predetermined storage means such as the product DB 12a or by deciding association of each of the classification items and the predetermined word by extracting the predetermined word suited to an extraction pattern corresponding to the classification item from the predetermined storage means, a classification dictionary suited to the predetermined storage means can be constructed.

When compound word candidates are generated from a base word and a compound word is decided from the candidates, a more appropriate compound word can be generated from the generated candidates.

When the number of shops dealing in product by including the generated compound word candidate in their product description is obtained and a compound word is decided in accordance with the number of shops, a more appropriate compound word used generally on a shopping site operated by the information processing server 10 or in a network can be generated.

When a compound word is decided in accordance with the appearance number (for example, the frequency of appearance $N_{k1,k2}$) of abase word appearing in a predetermined storage means such as the query log DB 12j, a more appropriate compound word can be generated from a base word generally used on a shopping site or in a network.

When compound word candidates are generated by acquiring other words different from a base word and combining the base word and the other words, a more appropriate compound word can be generated. Many compound word candidates can be generated by combining the base word and other words and candidates can then be narrowed down to a more appropriate compound word. Further, still more compound word candidates can be generated by combining the base word, other words, and an intermediate word Incidentally, when products are registered in the shop terminal device 20, the present embodiment can be used to check whether a product name to be registered is appropriate or to obtain an appropriate product name of related product. A base word is transmitted from the shop terminal device 20 to the information processing server 10 and the information processing server 10 decides a compound word in S4. Then, the information processing server 10 transmits the compound word decided in S4 to the shop terminal device 20. The compound word is displayed in the display unit 23 of the shop terminal device 20.

Incidentally, when calculating the frequency of appearance $N_{k1,k2}$ in step S73, instead of the query log DB 12j as an example of the predetermined storage means, the system control unit 14 of the information processing server 10 may obtain the number of hits when the base word and other words are set as search keywords (for example, "HERUMETTO JITENSHA" (helmet bicycle)) in the product DB 12a and set as the frequency of appearance $N_{k1,k2}$.

When obtaining the frequency of appearance $N_{k1,k2}$ and the number of shops $M_{k1,s,k2}$, the frequency of appearance or the number of shops in the network 3 may be obtained without being limited to the shopping site of the information processing server 10. When, for example, the number of shops in the network 3 is obtained, URLs where product is sold may be counted after conducting a search based on a compound word candidate "JITENSHA YOU HERUMETTO" (helmet for bicycle).

In step S72, the system control unit 14 of the information processing server 10 may obtain the number of hits of a search using a generated compound word candidate as a search keyword. The number of hits of a search may be the number of hits in the product DB 12a or the number of hits in the network 3. The system control unit 14 of the information processing server 10 uses, instead of $M_{k1,s,k2}$, the number of hits to calculate Score (k1,s,k2). The system control unit 14 of the information processing server 10 may also calculate Score (k1,s,k2) from the number of hits, the frequency of appearance $N_{k1,k2}$, and the number of shops $M_{k1,s,k2}$.

When the compound word is decided in accordance with the number of hits of a search using a generated compound word candidate as a search keyword, a compound word used generally on a shopping site or in a network can be decided so that a more appropriate compound word can be generated.

The system control unit 14 of the information processing server 10 may also extract, for example, other words "JITENSHA" (bicycle) and "KODOMO" (child) from "JITENSHA YOU HERUMETTO" (helmet for bicycle) and "KODOMO YOU HERUMETTO" (helmet for children) stored as base words by referring to the query log DB 12j.

In addition, a base word of the query log DB 12j containing the base word "HERUMETTO" (helmet) may be adopted as a compound word. For example, the system control unit 14 of the information processing server 10 extracts "JITENSHA YOU HERUMETTO" (helmet for bicycle) and "KODOMO YOU HERUMETTO" (helmet for children) stored in a base word area of the query log DB 12*j* as compound word candidates from the base word "HERUMETTO" (helmet).

[5. Modifications of Display]

Next, modifications of the display will be described using FIGS. 20 and 21.

Figure 20:
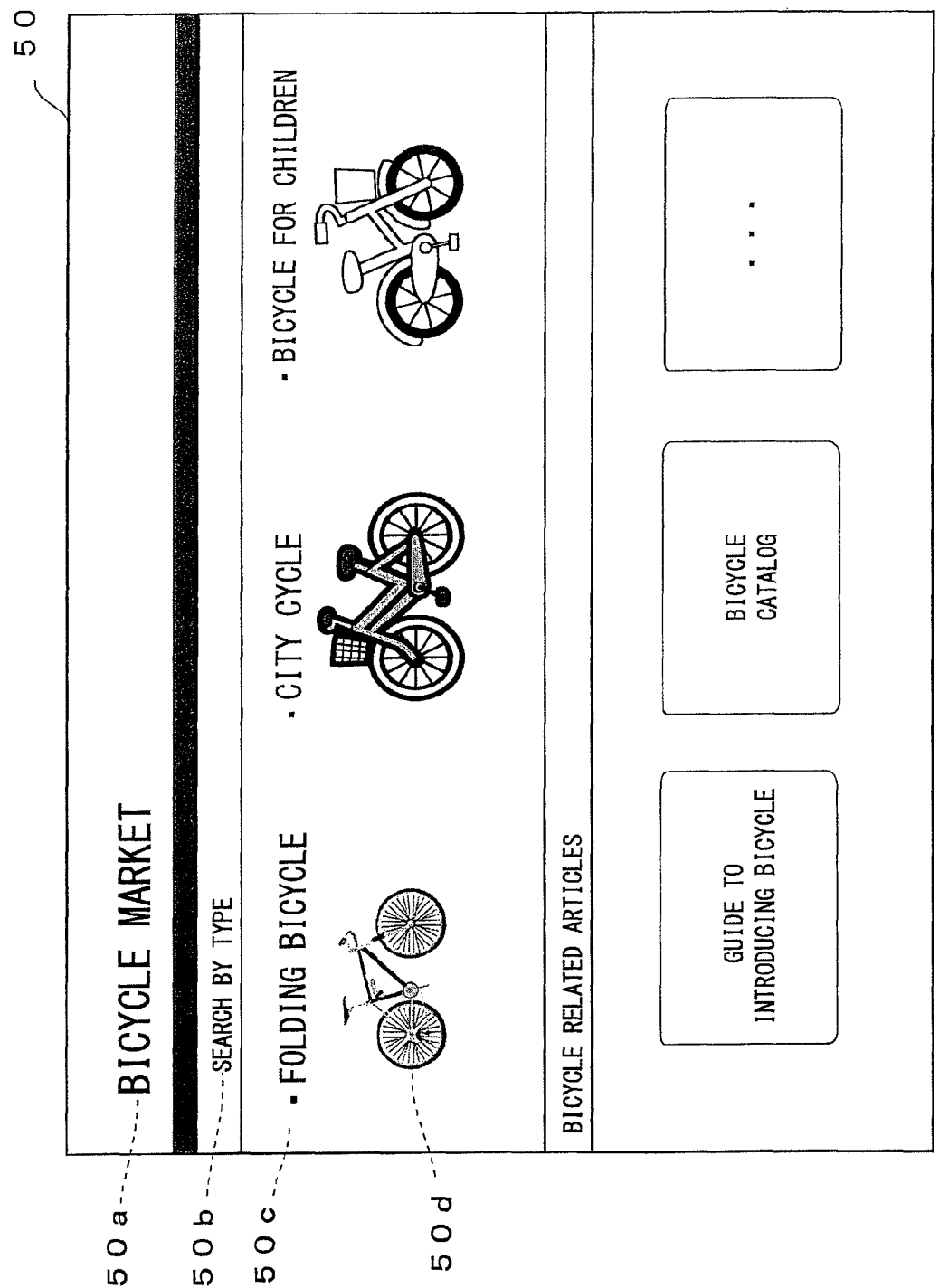
FIG. 20 is a schematic diagram showing a modification of a display by the information processing server in FIG. 1.
Figure 21:
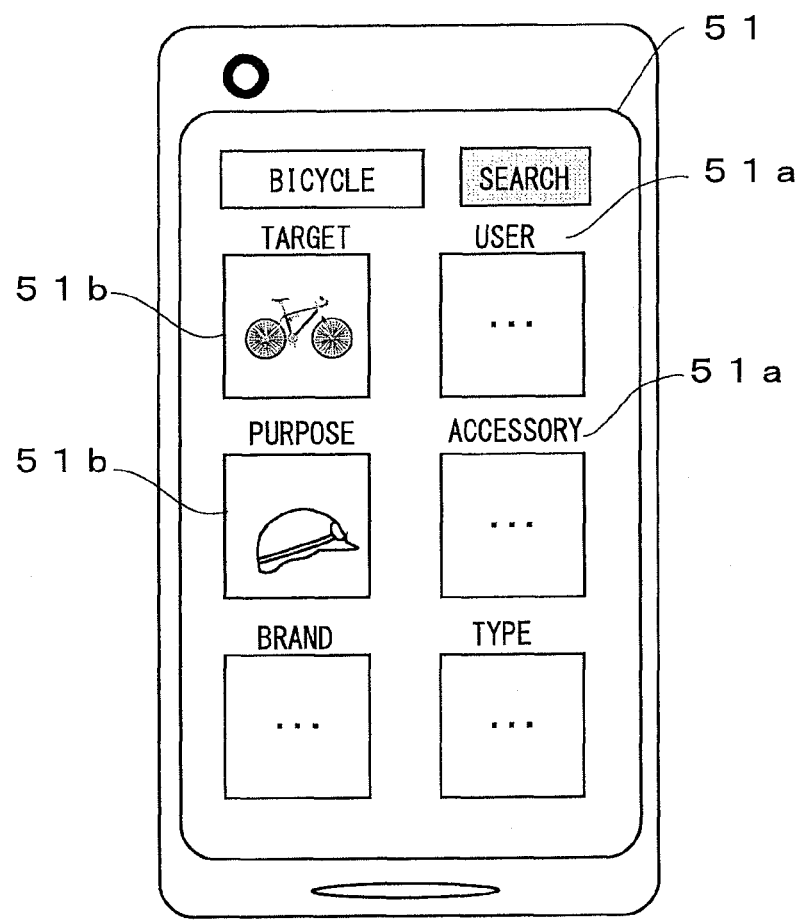
FIG. 21 is a schematic diagram showing a modification of the display by the information processing server in FIG. 1.

FIGS. 20 and 21 are schematic diagrams showing modifications of a display by the information processing server 10.

(5.1 First Modification of Display)

First, a first modification of the display will be described using FIG. 20.

As shown in FIG. 20, the information processing server 10 may generate a Web page 50 as a special topic page related to a base word. The Web page 50 includes a base word name 50*a*, a classification item name 50*b*, a compound word name 50*c*, and an image 50*d* for each product. The base word name 50*a* indicates a base word. The classification item name 50*b* indicates one classification item selected from a plurality of classification items. The compound word name 50*c* indicates a compound word related to the base word. The image 50*d* of product is an image of product corresponding to a compound word related to a base word.

In step S10 or S50, the information processing server 10 acquires, for example, one set word "JITENSHA" (bicycle) as a base word (base word name 50*a*).

In step S15 or S56, the information processing server 10 sets one classification item (classification item name 50*b*) from classification items into which compound words related to the base word are distributed.

Next, as shown in FIG. 20, the information processing server 10 generates, based on a compound word (compound word name 50*c*) related to the one set classification item, the Web page 50 in which the compound word names 50*c* and the images 50*d* of product are arranged for the base word name 50*a* and the classification item name 50*b*. The information processing server 10 arranges the compound word names (product names) 50*c* and the images 50*d* of the product in the Web page 50. Incidentally, the compound word names 50*c* and the images 50*d* of the product correspond to elements contained in base word related information. In addition, the base word "JITENSHA" (bicycle) may be a similar word ""SAIKURU (cycle).

(5.2 Second Modification of Display)

Next, a second modification of the display will be described using FIG. 21.

As shown in FIG. 21, the information processing server 10 may generate a Web page 51 for mobile terminals. In step S10 or S50, the information processing server 10 acquires a search keyword input into the Web page 51 as a base word.

After compound words being distributed into classification items, in step S16 or S57, the information processing server 10 conducts a search based on the search keyword and acquires a search result.

In step S17 or S58, the information processing server 10 generates the Web page 51 for mobile terminals by classification item. In the Web page 51, images 51*b* of hit product are arranged by classification item (classification item name 51*a*). When the image 51*b* of product is tapped or touched, a search result of a compound word corresponding to the classification item is displayed.

If, as shown in FIG. 21, the display unit is narrow, a rough display by a compound word corresponding to the classification item can be presented to the user, improving user's convenience.

Further, the present invention is not limited to each of the above embodiments. Each of the above embodiments is by way of example and all inventions having substantially the same configuration as that of technical ideas described in claims of the present invention and achieving similar operation effects are included in the technical scope of the present invention.

EXPLANATION OF REFERENCE NUMERALS

1: Information processing system
3: Network
5: Search server
10: Information processing server (information processing device)
12: Storage unit
12*a*: Product DB (predetermined storage means)
12*b*: Shop DB (predetermined storage means)
12*d*: Compound word DB (compound word storage means)
12*e*: Classification item DB (classification item storage means)
12*f*: LSP-DB (feature information storage means)
12*g*: Suffix DB (feature information storage means)
12*h*: Classification dictionary DB (feature information storage means)
12*i*: Training DB (classification item storage means)
12*j*: Query log DB (predetermined storage means)
102: Feature information database (feature information storage means)
14*c*: RAM
20: Shop terminal device
30: User terminal device
40, 50, 51: Web page (base word related information, search result information)
41: Related product region (second search result)
42: Classification item region
42*a*, 50*b*: Classification item name
42*b*, 51*b*: Image of product
42*c*: Modifier portion name
43: Search result region (portion of a first search result)
50*a*: Base word name
50*c*: Compound word name

The invention claimed is:

1. An information processing device, comprising:
at least one memory operable to store program code;
at least one processor operable to read the program code and operate as instructed by the program code, the program code including:
  base word acquisition code configured to cause the at least one processor to acquire a base word to be a base;
  compound word acquisition code configured to cause the at least one processor to acquire a compound word in which the base word acquired by the base word acquisition code becomes a modifiee from a compound word storage;
  classification item acquisition code configured to cause the at least one processor to acquire classification items to classify the compound word acquired by the compound word acquisition code by referring to a classification item storage, the classification item storage storing predetermined classification items that are set in advance;
  feature information acquisition code configured to cause the at least one processor to acquire feature information about a feature that provides a clue to classify the compound word acquired by the compound word acquisition code by referring to a feature information storage;
  compound word classification code configured to cause the at least one processor to distribute the compound word containing the base word into the classification item acquired by the classification item acquisition code, the classification item being set in advance and stored in the classification item storage, using a classification model generated in advance and the feature information acquired by the feature information acquisition code for the compound word acquired by the compound word acquisition code;

base word related information acquisition code configured to cause the at least one processor to acquire base word related information containing a plurality of elements related to the base word based on the base word;

base word related information classification code configured to cause the at least one processor to classify each of a portion of the elements contained in the base word related information acquired by the base word related information acquisition code into one of the classification items in accordance with a classification result by the compound word classification code; and output code configured to cause the at least one processor to output, to be displayed on a screen of a display of a user terminal device, the base word related information classified by the base word related information classification code along with an indication of the classification item into which the base word related information is classified.

2. The information processing device according to claim 1, further comprising:

feature vector generation code configured to cause the at least one processor to generate a feature vector of the compound word using the feature information for the compound word;

training compound word acquisition code configured to cause the at least one processor to acquire a compound word for training;

training classification item acquisition code configured to cause the at least one processor to acquire classification items for training corresponding to the compound word for training acquired by the training compound word acquisition code; and classification model construction code configured to cause the at least one processor to construct the classification model by doing machine training using the feature vector of the compound word for training generated by the feature vector generation code from the compound word for training acquired by the training compound word acquisition code and the classification items for training acquired by the training classification item acquisition code, wherein the feature vector generation code causes the at least one processor to generate the feature vector of the compound word by using the feature information for the compound word acquired by the compound word acquisition code, and the compound word classification code causes the at least one processor to distribute the compound word containing the base word into the classification item using the classification model constructed by the classification model construction code and the feature vector of the compound word acquired by the compound word acquisition code.

3. The information processing device according to claim 1, further comprising:

modifier portion acquisition code configured to cause the at least one processor to acquire a modifier portion with respect to the base word of the compound word, wherein the feature information storage code causes the at least one processor to store a classification dictionary associating each of the classification items and a predetermined word, the feature information acquisition code causes the at least one processor to acquire the classification dictionary associating each of the classification items and the predetermined word by referring to the feature information storage, and the compound word classification code configured to cause the at least one processor to distribute the compound word containing the base word into the classification item using the classification model generated in advance using the classification dictionary stored in the feature information storage and the feature information for the modifier portion acquired by the modifier portion acquisition code.

4. The information processing device according to claim 3, further comprising:

suffix acquisition code configured to cause the at least one processor to acquire a suffix from the modifier portion acquired by the modifier portion acquisition code, wherein the compound word classification code causes the at least one processor to distribute the compound word containing the base word into the classification item, using the classification model generated in advance using the classification dictionary stored in the feature information storage, and using the feature information for the modifier portion excluding the suffix acquired by the suffix acquisition code.

5. The information processing device according to claim 3, further comprising:

classification dictionary generation code configured to cause the at least one processor to generate the classification dictionary by determining association of each of the classification items and the predetermined word in accordance with an appearance number of the predetermined word appearing in a predetermined storage, or by determining association of each of the classification items and the predetermined word by extracting the predetermined word suited to an extraction pattern corresponding to each of the classification items from the predetermined storage.

6. The information processing device according to claim 1, further comprising:

classification item output code configured to cause the at least one processor to output the classification items into which the compound words are distributed to the user terminal device to allow a user to select the specific classification item from the classification items into which the compound words are distributed by the compound word classification code; and user selection result acquisition code configured to cause the at least one processor to acquire a selection result of the classification items from the user terminal device, wherein the base word related information classification causes the at least one processor to classify each of at least a portion of the elements contained in the base word related information acquired based on the base word and the selection result of the classification items acquired by the user selection result acquisition code, into one of the classification items in accordance with the classification result by the compound word classification code.

7. The information processing device according to claim 1, wherein
the base word acquisition causes the at least one processor to acquire a search keyword from the user terminal device as the base word,
the base word related information acquisition code causes the at least one processor to acquire a search result of conducting a search based on the search keyword, and
the base word related information classification code causes the at least one processor to classify each of at least a portion of the elements contained in the search result of conducting the search by the base word related information acquisition code, into one of the classification items in accordance with the classification result by the compound word classification code.

8. The information processing device according to claim 1, further comprising:
compound word candidate generation code configured to cause the at least one processor to generate candidates of the compound word from the base word; and
compound word determination code configured to cause the at least one processor to determine the compound word from the candidates, wherein
the compound word acquisition causes the at least one processor to acquire the compound word determined by the compound word determination code.

9. The information processing device according to claim 8, wherein
the compound word code causes the at least one processor to determine the compound word in accordance with the number of shops after the number of shops dealing in product by including candidates of the compound word generated by the compound word candidate generation code in a description of the product being obtained.

10. The information processing device according to claim 8, wherein
the compound word determination code causes the at least one processor to determine the compound word in accordance with the appearance number of the base word appearing in the predetermined storage.

11. The information processing device according to claim 8, wherein
the compound word determination code causes the at least one processor to determine the compound word in accordance with the number of hits of a search using the candidate of the compound word generated by the compound word candidate generation code as a search keyword.

12. The information processing device according to claim 8, wherein
the compound word candidate generation code causes the at least one processor to generate the candidate by combining the base word and a word different from the base word.

13. The information processing device according to claim 1, further comprising:
search result acquisition code configured to cause the at least one processor to acquire a first search result using the base word as the search keyword and a second search result using the compound word as the search keyword; and
search result information generation code configured to cause the at least one processor to generate search result information so that at least a portion of the first search result and the second search result acquired by the search result acquisition code are made to be distinguished and displayed on the screen of the display of the user terminal device.

14. The information processing device according to claim 13, wherein
the search result information generation code causes the at least one processor to generate the search result information so that the search result obtained by removing a portion of the second search result from the first search result is made to be displayed as at least the portion of the first search result.

15. An information processing method of an information processing device that performs information processing, comprising:
a base word acquisition step of acquiring a base word to be a base;
a compound word acquisition step of acquiring a compound word in which the base word acquired in the base word acquisition step becomes a modifiee from a compound word storage unit;
a classification item acquisition step of acquiring classification items to classify the compound word acquired in the compound word acquisition step by referring to a classification item storage unit, the classification item storage unit storing predetermined classification items that are set in advance;
a feature information acquisition step of acquiring feature information about a feature that provides a clue to classify the compound word acquired in the compound word acquisition step by referring to a feature information storage unit;
a compound word classification step of distributing the compound word containing the base word into the classification item acquired in the classification item acquisition step, the classification item being set in advance and stored in the classification item storage, using a classification model generated in advance and the feature information acquired in the feature information acquisition step for the compound word acquired in the compound word acquisition step;
a base word related information acquisition step of acquiring base word related information containing a plurality of elements related to the base word based on the base word;
a base word related information classification step of classifying each of a portion of the elements contained in the base word related information acquired in the base word related information acquisition step into one of the classification items in accordance with a classification result in the compound word classification step; and
an output step of outputting, to be displayed on a screen of a display of a user terminal device, the base word related information classified in the base word related information classification step along with an indication of the classification item into which the base word related information is classified.

16. A non-transitory recording medium computer-readably recording a program for an information processing device causing
a computer to function as:
a base word acquisition unit that acquires a base word to be a base;
a compound word acquisition unit that acquires a compound word in which the base word acquired by the base word acquisition unit becomes a modifiee from a compound word storage unit;

a classification item acquisition unit that acquires classification items to classify the compound word acquired by the compound word acquisition unit by referring to a classification item storage unit, the classification item storage storing predetermined classification items that are set in advance;

a feature information acquisition unit that acquires feature information about a feature that provides a clue to classify the compound word acquired by the compound word acquisition unit by referring to a feature information storage unit;

a compound word classification unit that distributes the compound word containing the base word into the classification item acquired by the classification item acquisition unit, the classification item being set in advance and stored in the classification item storage, using a classification model generated in advance and the feature information acquired by the feature information acquisition unit for the compound word acquired by the compound word acquisition unit;

a base word related information acquisition unit that acquires base word related information containing a plurality of elements related to the base word based on the base word;

a base word related information classification unit that classifies each of a portion of the elements contained in the base word related information acquired by the base word related information acquisition unit into one of the classification items in accordance with a classification result by the compound word classification unit; and an output unit that outputs, to be displayed on a screen of a display of a user terminal device, the base word related information classified by the base word related information classification unit along with an indication of the classification item into which the base word related information is classified.

* * * * *